US012608931B2

(12) United States Patent
Jenkins et al.

(10) Patent No.: US 12,608,931 B2
(45) Date of Patent: Apr. 21, 2026

(54) GENERATING AERIAL PATHS BASED ON PROPERTIES OF AERIAL IMAGE DATA

(71) Applicant: Wing Aviation LLC, Palo Alto, CA (US)

(72) Inventors: Kevin Jenkins, Dallas, TX (US); Ali Shoeb, San Rafael, CA (US)

(73) Assignee: Wing Aviation LLC, Palo Alto, CA (US)

( * ) Notice: Subject to any disclaimer, the term of this patent is extended or adjusted under 35 U.S.C. 154(b) by 28 days.

(21) Appl. No.: 18/640,577

(22) Filed: Apr. 19, 2024

(65) Prior Publication Data

US 2025/0329159 A1 Oct. 23, 2025

(51) Int. Cl.
*G06V 10/70* (2022.01)
*G05D 1/243* (2024.01)
*G06T 7/73* (2017.01)
*G06V 20/17* (2022.01)
*G05D 109/20* (2024.01)
*G05D 111/10* (2024.01)

(52) U.S. Cl.
CPC ............. *G06V 20/17* (2022.01); *G05D 1/243* (2024.01); *G06T 7/74* (2017.01); *G06V 10/70* (2022.01); *G05D 2109/20* (2024.01); *G05D 2111/10* (2024.01); *G06T 2207/10032* (2013.01)

(58) Field of Classification Search
CPC .......... G06V 20/17; G06V 10/70; G06T 7/74; G06T 2207/10032; G05D 1/243; G05D 2109/20; G05D 2111/10
See application file for complete search history.

(56) References Cited

U.S. PATENT DOCUMENTS

| | | | |
|---|---|---|---|
| 5,706,011 | A | 1/1998 | Huss et al. |
| 6,085,147 | A | 7/2000 | Myers |
| 6,259,988 | B1 | 7/2001 | Galkowski et al. |
| 8,082,102 | B2 | 12/2011 | Ravenscroft |
| 10,490,091 | B1 | 11/2019 | Lenhardt et al. |
| 10,724,505 | B2 | 7/2020 | Thiercelin et al. |

(Continued)

FOREIGN PATENT DOCUMENTS

| | | |
|---|---|---|
| EP | 2711913 | 3/2014 |
| WO | 2024/019975 | 1/2024 |

OTHER PUBLICATIONS

"After Three Years on Mars, NASA's Ingenuity Helicopter Mission Ends," Jet Propulsion Laboratory, Jan. 25, 2024, 5 pages.

(Continued)

*Primary Examiner* — Mathew Franklin Gordon
(74) *Attorney, Agent, or Firm* — McDonnell Boehnen Hulbert & Berghoff LLP

(57) ABSTRACT

A method includes receiving an input specifying a starting location and a destination location for an aerial vehicle. The method additionally includes determining, based on the starting location and the destination location, an aerial path for the aerial vehicle to follow from the starting location to the destination location. The method also includes determining, based on the aerial path, a property of aerial image data, where the aerial image data is obtainable using the aerial vehicle while traversing the aerial path, and where the aerial image data represents an environment along the aerial path. The method further includes determining, based on the property, a path score associated with the aerial path, and outputting the aerial path based on the path score.

20 Claims, 12 Drawing Sheets

(56)  References Cited

U.S. PATENT DOCUMENTS

| | | |
|---|---|---|
| 11,482,117 B2 | 10/2022 | Sachs et al. |
| 2016/0217694 A1 | 7/2016 | Batla et al. |
| 2020/0025840 A1 | 1/2020 | Bickford |
| 2020/0028639 A1 | 1/2020 | Lindqvist et al. |
| 2020/0258400 A1 | 8/2020 | Yuan et al. |
| 2020/0286391 A1 | 9/2020 | Beaurepaire et al. |
| 2021/0287559 A1 | 9/2021 | Jeong et al. |
| 2022/0039791 A1 | 2/2022 | Miller et al. |
| 2022/0244054 A1 | 8/2022 | Zhang |
| 2022/0397917 A1 | 12/2022 | Arksey et al. |
| 2023/0244250 A1 | 8/2023 | Abeywardena et al. |
| 2023/0334851 A1 | 10/2023 | Fathi et al. |
| 2024/0002096 A1 | 1/2024 | Salminen et al. |
| 2024/0020968 A1 | 1/2024 | Haskin et al. |

OTHER PUBLICATIONS

Achat et al., "Path Planning Incorporating Semantic Information for Autonomous Robot Navigation," https://w3.onera.fr/copernic/sites/w3.onera.fr.copernic/files/documents/conference_papers/2022_-_icinco_-_path_planning_incorporating_semantic_information_for_autonomous_robot_navigation.pdf, 2022, 11 pages.

Ackerman, Evan, "Blade Strike on Landing Ends Mars Helicopter's Epic Journey: NASA discusses what they think happened on Ingenuity's final flight," IEEE Spectrum, Jan. 25, 2024, 11 pages.
Ackerman, Evan, "How NASA Designed a Helicopter That Could Fly Autonomously on Mars," IEEE Spectrum, Feb. 17, 2021, 13 pages.
Dorling et al., "Vehicle Routing Problems for Drone Delivery," IEEE Transactions on Systems, Man, and Cybernetics: Systems, arXiv:1608.02305v1, Aug. 8, 2016, 16 pages.
Liu et al., "An Autonomous Path Planning Method for Unmanned Aerial Vehicle based on A Tangent Intersection and Target Guidance Strategy," IEEE Transactions on Intelligent Transportation Systems, vol. 23, No. 4, pp. 3061-3073, Apr. 2022, doi: 10.1109/TITS.2020.3030444.
NASA, "Flight Software & Embedded Systems Framework," https://nasa.github.io/fprime/, 2020, 2 pages.
Thibbotuwawa et al., "UAV Mission Planning Resistant to Weather Uncertainty," Sensors, 2020, 24 pages, vol. 515.
Yonetani et al., "Path Planning using Neural A* Search," Proceedings of the 38th International Conference on Machine Learning, PMLR 139, 2021, 11 pages.
International Searching Authority, International Search Report and Written Opinion mailed Aug. 1, 2025, issued in connection with International Patent Application No. PCT/US2024024675, filed Apr. 15, 2025, 11 pages.

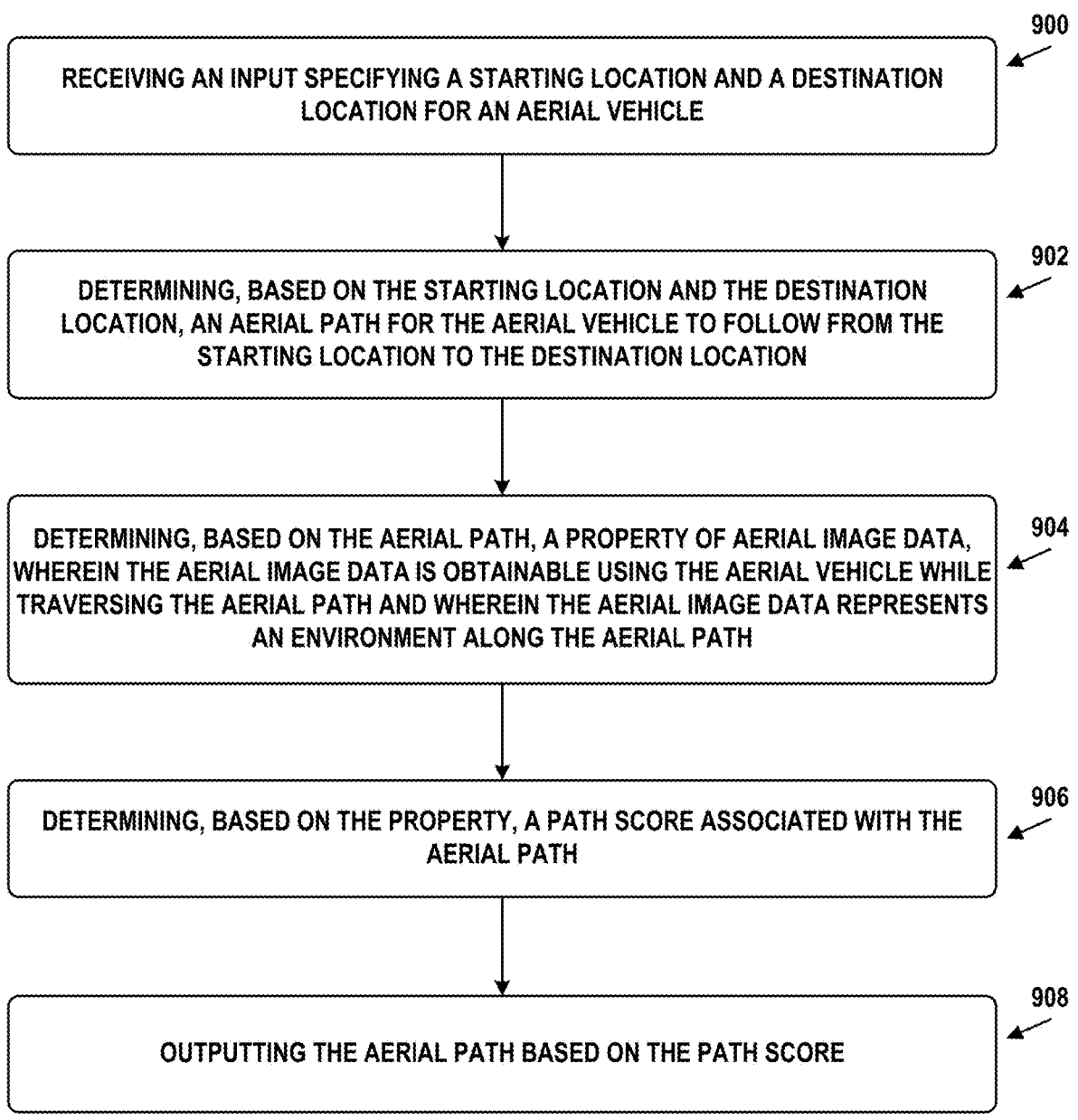

900

RECEIVING AN INPUT SPECIFYING A STARTING LOCATION AND A DESTINATION LOCATION FOR AN AERIAL VEHICLE

902

DETERMINING, BASED ON THE STARTING LOCATION AND THE DESTINATION LOCATION, AN AERIAL PATH FOR THE AERIAL VEHICLE TO FOLLOW FROM THE STARTING LOCATION TO THE DESTINATION LOCATION

904

DETERMINING, BASED ON THE AERIAL PATH, A PROPERTY OF AERIAL IMAGE DATA, WHEREIN THE AERIAL IMAGE DATA IS OBTAINABLE USING THE AERIAL VEHICLE WHILE TRAVERSING THE AERIAL PATH AND WHEREIN THE AERIAL IMAGE DATA REPRESENTS AN ENVIRONMENT ALONG THE AERIAL PATH

906

DETERMINING, BASED ON THE PROPERTY, A PATH SCORE ASSOCIATED WITH THE AERIAL PATH

908

OUTPUTTING THE AERIAL PATH BASED ON THE PATH SCORE

Figure 9

GENERATING AERIAL PATHS BASED ON PROPERTIES OF AERIAL IMAGE DATA

BACKGROUND

Aerial paths from a starting location to a destination location for an aerial vehicle may be generated based on geographical, environmental, regulatory, and/or technical factors, considerations, and/or constraints. Improvements to the generation of aerial paths may enhance the efficiency, safety, and/or reliability of aerial travel. These improvements may also allow for the generation of aerial paths that are relatively better for navigation, more robust, and/or otherwise improved.

SUMMARY

Aerial paths from a starting location to a destination location for an aerial vehicle may be generated based on different factors and/or constraints, including a property of aerial image data obtainable by the aerial vehicle along the aerial path. More specifically, an aerial path generator may be configured to output an aerial path by determining the property of the aerial image data, where the aerial image data represents an environment along the aerial path. The aerial path generator may be configured to calculate a path score associated with the aerial path based on the property, and output the aerial path based on the path score.

The property of the aerial image data may indicate a quantitative measure of visual features expected to be detectable in the aerial image data, where the quantitative measure may be indicative of a usability of the aerial image data for controlling the aerial vehicle. In some cases, the aerial path generator may be configured to determine the usability by utilizing a machine learning model. As an example, the property may include a predicted utility of the aerial image data for navigating the aerial vehicle in an environment along the aerial path by using visual-inertial odometry. As another example, the property may include a predicted utility of the aerial image data for semantic localization of the aerial vehicle in an environment along the aerial path. For instance, if the property indicates that the aerial image data is relatively useful for performing semantic localization of the aerial vehicle in the environment, the aerial path generator may be configured to score the aerial path accordingly.

In a first example embodiment, a method may include receiving an input specifying a starting location and a destination location for an aerial vehicle. The method may additionally include determining, based on the starting location and the destination location, an aerial path for the aerial vehicle to follow from the starting location to the destination location. The method may also include determining, based on the aerial path, a property of aerial image data. The aerial image data may be obtainable using the aerial vehicle while traversing the aerial path. The aerial image data may represent an environment along the aerial path. The method may further include determining, based on the property, a path score associated with the aerial path, and outputting the aerial path based on the path score.

In a second example embodiment, a system may include a processor and a non-transitory computer-readable medium having stored thereon instructions that, when executed by the processor, cause the processor to perform operations in accordance with the first example embodiment.

In a third example embodiment, a non-transitory computer-readable medium may have stored thereon instructions that, when executed by a computing device, cause the computing device to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 9 is a flow chart, in accordance with examples described herein.

DETAILED DESCRIPTION

Figure 1A:
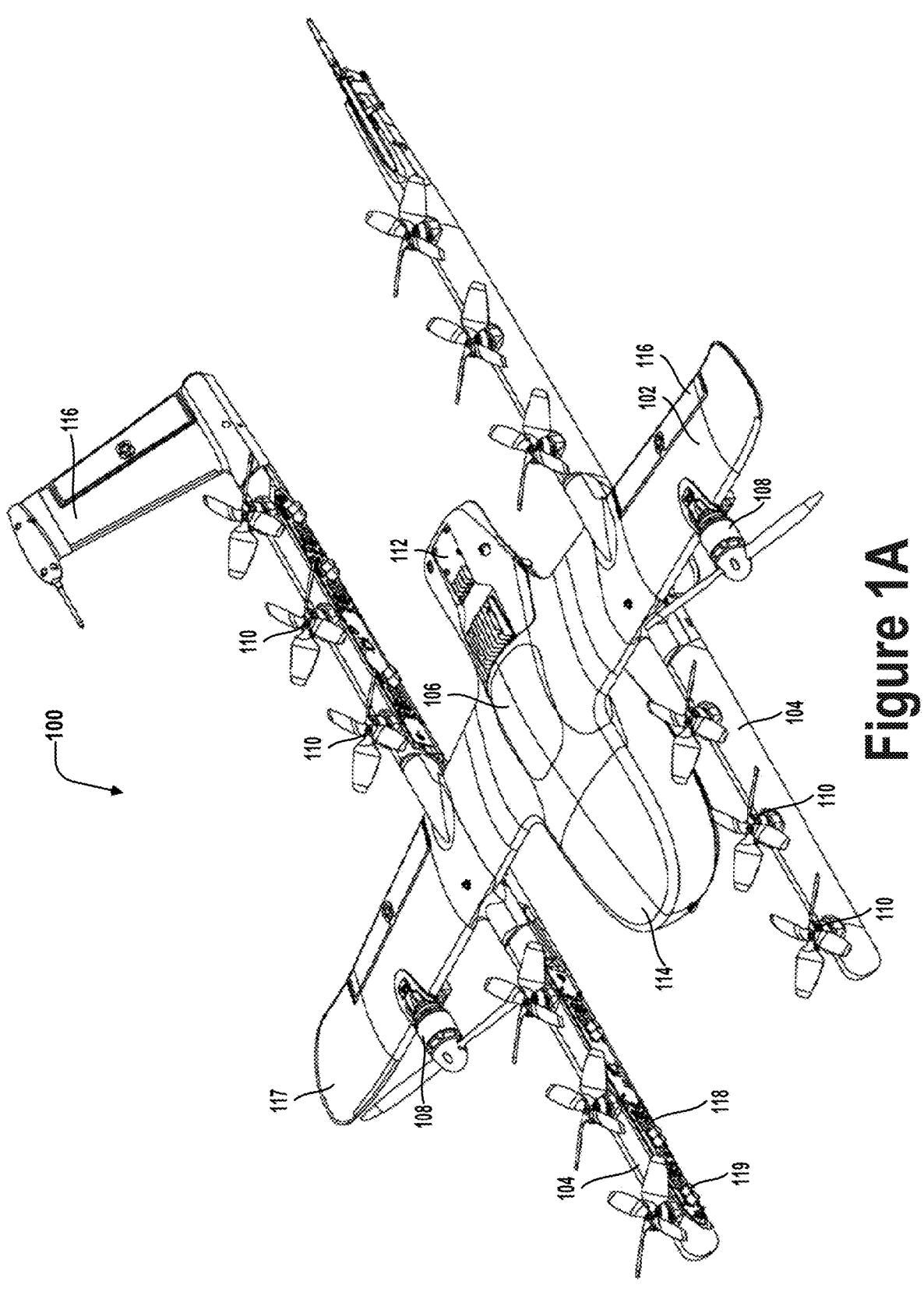
FIG. 1A illustrates an uncrewed aerial vehicle, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

Aerial paths for an aerial vehicle (e.g., a drone) may be determined by taking into account various considerations and/or constraints. One group of considerations and/or constraints includes an expected utility and/or viability of the aerial vehicle's secondary navigational systems along the aerial path. An aerial vehicle may include different types of secondary navigational systems, which may be used to supplement and/or replace a primary (e.g., satellite-based) navigation system of the aerial vehicle. The secondary navigation systems may include an image-based navigation system, which may use visual-inertial odometry (VIO) and/or semantic localization to determine a pose and/or motion of the aerial vehicle.

VIO is a technology used to estimate an aerial vehicle's position, orientation, and/or motion based on visual information from visual sensors (such as cameras), possibly in combination with inertial information from inertial sensors (such as accelerometers and gyroscopes). For the aerial vehicle to use VIO relatively effectively, it may be beneficial that aerial image data gathered from the visual sensors along the aerial path be usable to estimate position, orientation, and/or motion of the aerial vehicle. Specifically, VIO may rely on two successive aerial images both representing at least one visual feature in the environment that can be detected and tracked from one aerial image to the next, thus visually representing how the aerial vehicle is moving relative to this visual feature.

As an example, aerial image data captured along an aerial path in a neighborhood with many different houses may have multiple visual features (e.g., the houses, the streets on which the houses are located, etc.) that could enable the aerial vehicle to determine, for instance, a direction, speed, and/or acceleration of forward motion. On the other hand, aerial image data captured along an aerial path going over a body of water may contain mostly blue sky and blue water, with few discernible features. This may render VIO navigation less effective on the aerial path over the body of water, as any given region of the water may appear too similar to all other regions of the water to reliably track the given region across successive aerial images.

Semantic localization may be used to estimate the aerial vehicle's location within an environment based on semantic information extracted from aerial image data of the environment. Semantic localization may rely on geometric features like landmarks, and/or semantic understanding of the environment. For the aerial vehicle to use semantic localization relatively effectively, it may be beneficial that the aerial image data along the aerial path be usable to locate the aerial vehicle in the environment. Semantic localization may involve matching a particular visual feature detected within the aerial image data to a corresponding visual feature associated with a known geographic location, and may thus depend on the particular visual feature being unique in the context of the environment and/or distinct from other visual features within the environment. Semantic localization may be used to locate the aerial vehicle when, for example, there is only one instance of the particular visual feature along an aerial path, so that the detection of the particular feature unambiguously indicates the aerial vehicle's location. For example, if an aerial vehicle flies over the Eiffel Tower (or another highly-recognizable feature), semantic localization could be used to match aerial image data from the aerial vehicle to a reference map of Paris that indicates a location of the Eiffel tower, thus helping to locate the aerial vehicle as being near the Eiffel Tower.

Thus, an expected utility or usability of aerial image data along an aerial path for vision-based navigation may be considered as a factor when generating aerial paths for an aerial vehicle. For example, it may be beneficial to determine an aerial path that includes (i) visual features allowing for VIO along the aerial path and/or (ii) visual features allowing for semantic localization along the aerial path, thus allowing the aerial vehicle to use one or more of these techniques to assist with navigating through the environment. In some cases, the expected utility and/or usability of a given aerial image data and/or visual feature for VIO may differ from the expected utility and/or usability of this aerial image data and/or visual feature for semantic localization. Thus, it may be beneficial to determine the aerial path to provide visual features for both VIO and semantic localization. For example, the aerial path may be determined such that VIO and semantic localization is performable based on the aerial image data captured at predetermined intervals along the aerial path (e.g., every 5 meters), thus allowing all sections of the aerial path to provide at least some image data usable for vision-based navigation.

Accordingly, this disclosure relates to systems and methods for generating aerial paths based on properties of aerial image data, such as the usability of the aerial image data for VIO and/or semantic localization. By considering information obtainable from aerial image data along the aerial path when determining the aerial path, the aerial path may be better able to preserve, protect, and/or allow for use of vision-based navigation systems of the aerial vehicle. In turn, this may enhance the efficiency, safety, and/or reliability of aerial navigation and travel, since the vision-based navigation systems may replace and/or supplement the primary navigation system of the aerial vehicle.

II. Example Uncrewed Vehicles

Herein, the terms "unmanned aerial system," "uncrewed aerial system," and/or "UAV" refer to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "uncrewed aerial vehicle system" (UAVS), "unmanned aerial vehicle," or "uncrewed aerial vehicle" may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
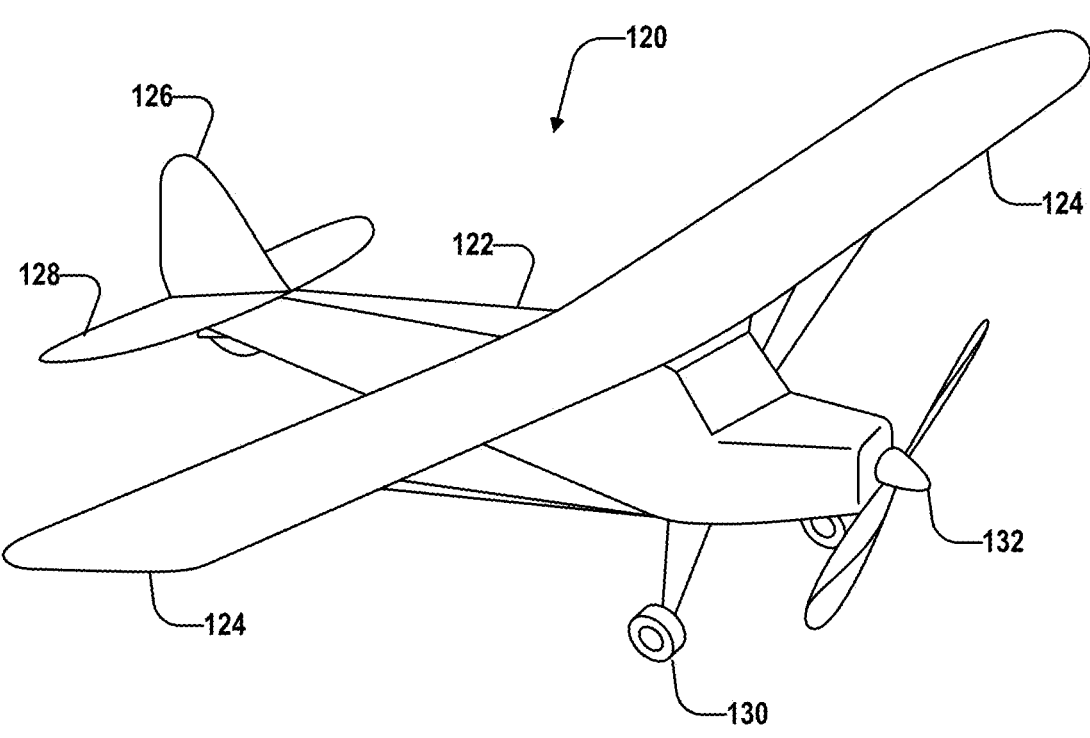
FIG. 1B illustrates an uncrewed aerial vehicle, in accordance with examples described herein.

Similarly, FIG. 1B shows another example of a fixed-wing UAV 120. Fixed-wing UAV 120 includes fuselage 122, two wings 124 with an airfoil-shaped cross section to provide lift for UAV 120, vertical stabilizer 126 (or fin) to stabilize the plane's yaw (turn left or right), horizontal stabilizer 128 (also referred to as an elevator or tailplane) to stabilize pitch (tilt up or down), landing gear 130, and propulsion unit 132, which can include a motor, shaft, and propeller.

Figure 1C:
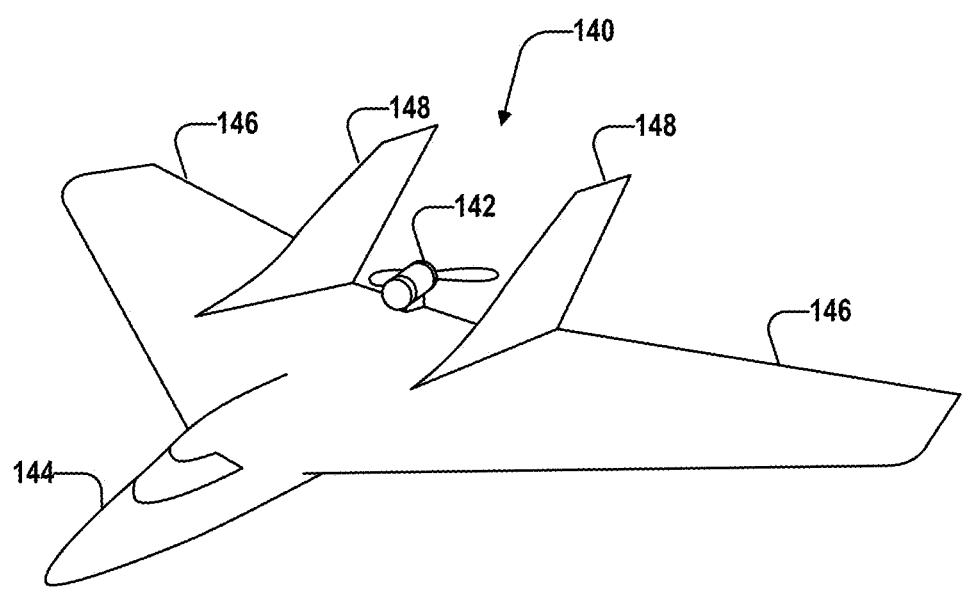
FIG. 1C illustrates an uncrewed aerial vehicle, in accordance with examples described herein.

FIG. 1C shows an example of UAV 140 with a propeller in a pusher configuration. The term "pusher" refers to the fact that propulsion unit 142 is mounted at the back of UAV 140 and "pushes" the vehicle forward, in contrast to the propulsion unit 142 being mounted at the front of UAV 140. Similar to the description provided for FIGS. 1A and 1B, FIG. 1C depicts common structures used in a pusher plane, including fuselage 144, two wings 146, vertical stabilizers 148, and propulsion unit 142, which can include a motor, shaft, and propeller.

Figure 1D:
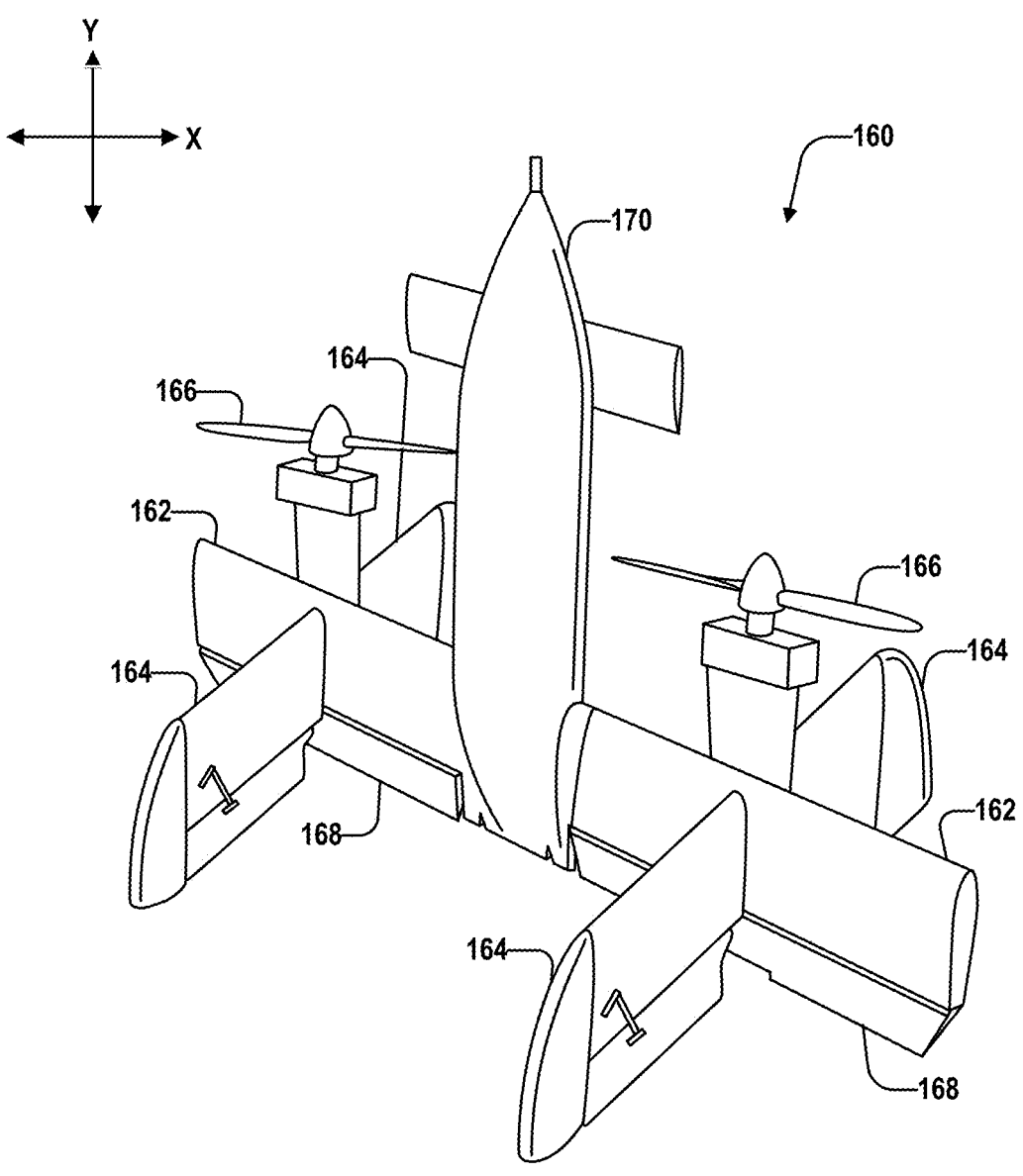
FIG. 1D illustrates an uncrewed aerial vehicle, in accordance with examples described herein.

FIG. 1D shows an example tail-sitter UAV 160. In the illustrated example, tail-sitter UAV 160 has fixed wings 162 to provide lift and allow UAV 160 to glide horizontally (e.g., along the x-axis, in a position that is approximately perpendicular to the position shown in FIG. 1D). However, fixed wings 162 also allow tail-sitter UAV 160 to take off and land vertically on its own.

For example, at a launch site, tail-sitter UAV 160 may be positioned vertically (as shown) with fins 164 and/or wings 162 resting on the ground and stabilizing UAV 160 in the vertical position. Tail-sitter UAV 160 may then take off by operating propellers 166 to generate an upward thrust (e.g., a thrust that is generally along the y-axis). Once at a suitable altitude, tail-sitter UAV 160 may use flaps 168 to reorient itself in a horizontal position, such that fuselage 170 is closer to being aligned with the x-axis than the y-axis. Positioned horizontally, propellers 166 may provide forward thrust so that tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
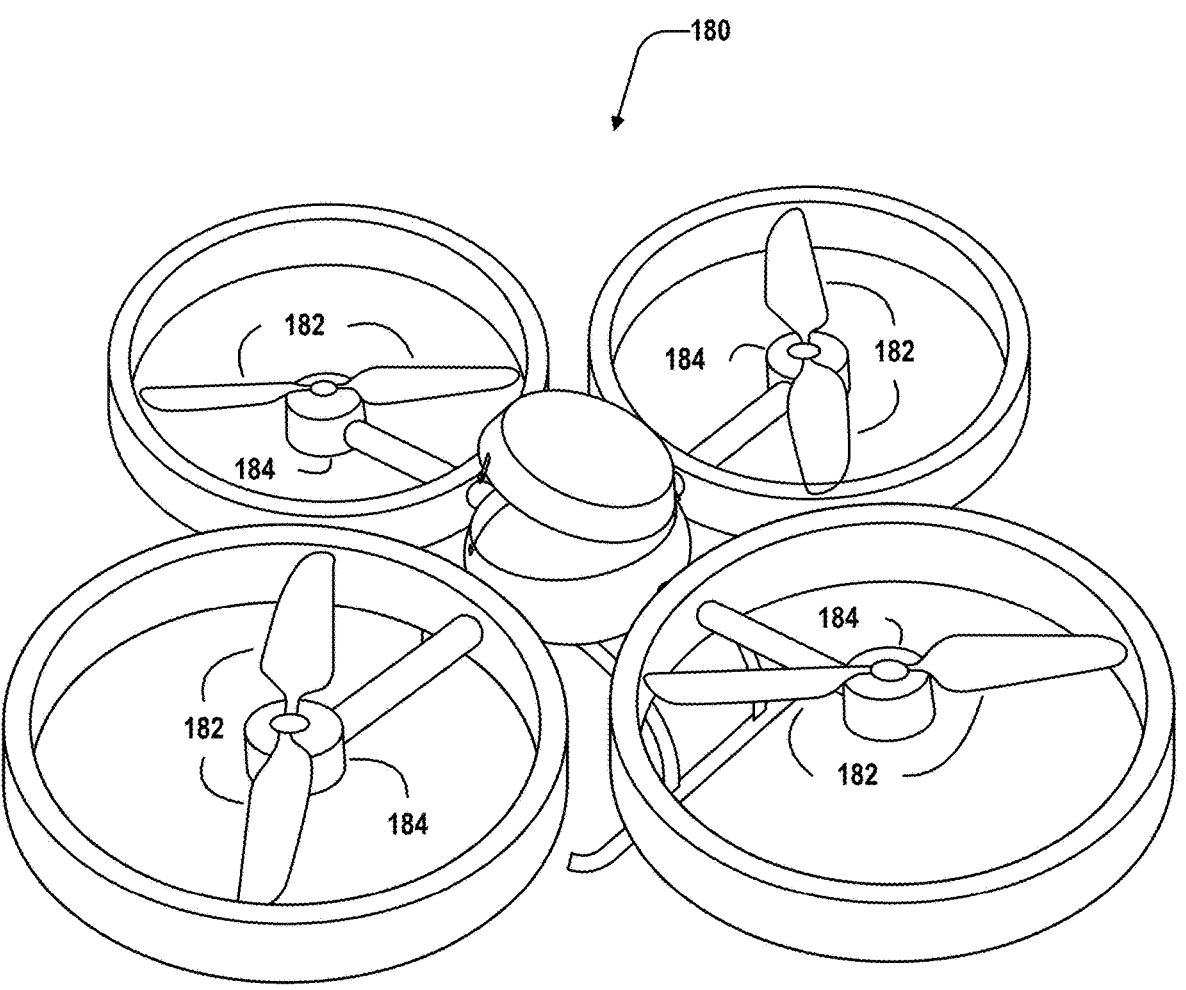
FIG. 1E illustrates an uncrewed aerial vehicle, in accordance with examples described herein.

As noted above, some embodiments may involve other types of UAVs, in addition to or in the alternative to fixed-wing UAVs. For instance, FIG. 1E shows an example of rotorcraft 180 that is commonly referred to as a multicopter. Multicopter 180 may also be referred to as a quadcopter, as it includes four rotors 182. It should be understood that example embodiments may involve a rotorcraft with more or fewer rotors than multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 180 in greater detail, four rotors 182 provide propulsion and maneuverability for multicopter 180. More specifically, each rotor 182 includes blades that are attached to motor 184. Configured as such, rotors 182 may allow multicopter 180 to take off and land vertically, to maneuver in any direction, and/or to hover. Further, the pitch of the blades may be adjusted as a group and/or differentially, and may allow multicopter 180 to control its pitch, roll, yaw, and/or altitude.

It should be understood that references herein to an "uncrewed" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of uncrewed aerial vehicle.

III. Example UAV Components

Figure 2:
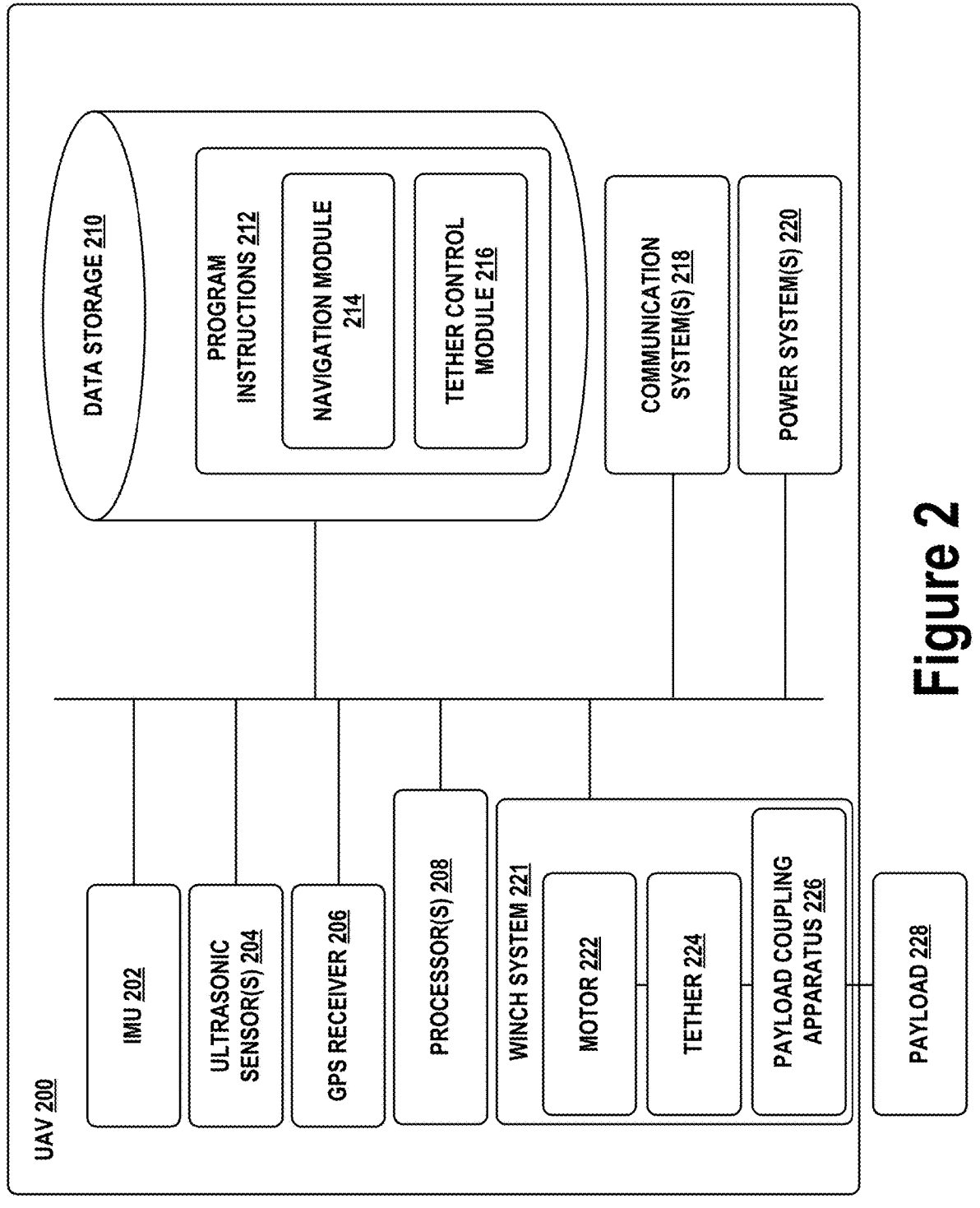
FIG. 2 illustrates components of an uncrewed aerial system, in accordance with examples described herein.

FIG. 2 is a simplified block diagram illustrating components of UAV 200, according to an example embodiment. UAV 200 may take the form of, or be similar in form to, one of UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include inertial measurement unit (IMU) 202, ultrasonic sensor(s) 204, and GPS receiver 206, among other possible sensors and sensing systems.

In the illustrated embodiment, UAV 200 also includes processor(s) 208. Processor 208 may be a general-purpose processor or a special purpose processor (e.g., digital signal processors, application specific integrated circuits, etc.). Processor(s) 208 can be configured to execute computer-readable program instructions 212 that are stored in data storage 210 and are executable to provide the functionality of a UAV described herein.

Data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of processor(s) 208. In some embodiments, data storage 210 can be implemented using a single physical device (e.g., one optical, magnetic, organic or other memory or disc storage unit), while in other embodiments, data storage 210 can be implemented using two or more physical devices.

As noted, data storage 210 can include computer-readable program instructions 212 and perhaps additional data, such as diagnostic data of UAV 200. As such, data storage 210 may include program instructions 212 to perform or facilitate some or all of the UAV functionality described herein. For instance, in the illustrated embodiment, program instructions 212 include navigation module 214 and tether control module 216.

In an illustrative embodiment, IMU 202 may include both an accelerometer and a gyroscope, which may be used together to determine an orientation of UAV 200. In particular, the accelerometer can measure the orientation of the vehicle with respect to earth, while the gyroscope measures the rate of rotation around an axis. IMUs are commercially available in low-cost, low-power packages. For instance, IMU 202 may take the form of or include a miniaturized MicroElectroMechanical System (MEMS) or a NanoElectroMechanical System (NEMS). Other types of IMUs may also be utilized.

IMU 202 may include other sensors, in addition to accelerometers and gyroscopes, which may help to better determine position and/or help to increase autonomy of UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for uncrewed vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with uncrewed vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include GPS receiver 206. GPS receiver 206 may be configured to provide data that is typical of well-known GPS systems, such as the GPS coordinates of UAV 200. Such GPS data may be utilized by UAV 200 for various functions. As such, the UAV may use GPS receiver 206 to help navigate to the caller's location, as indicated, at least in part, by the GPS coordinates provided by their mobile device. Other examples are also possible.

Navigation module 214 may provide functionality that allows UAV 200 to, for example, move about its environment and reach a desired location. To do so, navigation module 214 may control the altitude and/or direction of flight by controlling the mechanical features of the UAV that affect flight (e.g., its rudder(s), elevator(s), aileron(s), and/or the speed of its propeller(s)).

In order to navigate UAV 200 to a target location, navigation module 214 may implement various navigation techniques, such as map-based navigation and localization-based navigation, for instance. With map-based navigation, UAV 200 may be provided with a map of its environment, which may then be used to navigate to a particular location on the map. With localization-based navigation, UAV 200 may be capable of navigating in an unknown environment using localization. Localization-based navigation may involve UAV 200 building its own map of its environment and calculating its position within the map and/or the position of objects in the environment. For example, as UAV 200 moves throughout its environment, UAV 200 may continuously use localization to update its map of the environment. This continuous mapping process may be referred to as simultaneous localization and mapping (SLAM). Other navigation techniques may also be utilized.

In some embodiments, navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, navigation module 214 and/or other components and systems of UAV 200 may be configured for "localization" to more precisely navigate to the scene of a target location. More specifically, it may be desirable in certain situations for a UAV to be within a threshold distance of the target location where payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, UAV 200 may navigate to the general area of a target destination where payload 228 is being delivered using waypoints and/or map-based navigation. The UAV may then switch to a mode in which it utilizes a localization process to locate and travel to a more specific location. For instance, if UAV 200 is to deliver a payload to a user's home, UAV 200 may need to be substantially close to the target location in order to avoid delivery of the payload to undesired areas (e.g., onto a roof, into a pool, onto a neighbor's property, etc.). However, a GPS signal may only get UAV 200 so far (e.g., within a block of the user's home). A more precise location-determination technique may then be used to find the specific target location.

Various types of location-determination techniques may be used to accomplish localization of the target delivery location once UAV 200 has navigated to the general area of the target delivery location. For instance, UAV 200 may be equipped with one or more sensory systems, such as, for example, ultrasonic sensors 204, infrared sensors (not shown), and/or other sensors, which may provide input that navigation module 214 utilizes to navigate autonomously or semi-autonomously to the specific target location.

As another example, once UAV 200 reaches the general area of the target delivery location (or of a moving subject such as a person or their mobile device), UAV 200 may switch to a "fly-by-wire" mode where it is controlled, at least in part, by a remote operator, who can navigate UAV 200 to the specific target location. To this end, sensory data from UAV 200 may be sent to the remote operator to assist them in navigating UAV 200 to the specific location.

As yet another example, UAV 200 may include a module that is able to signal to a passer-by for assistance in reaching the specific target delivery location. For example, the UAV 200 may display a visual message requesting such assistance in a graphic display or play an audio message or tone through speakers to indicate the need for such assistance, among other possibilities. Such a visual or audio message might indicate that assistance is needed in delivering UAV 200 to a particular person or a particular location, and might provide information to assist the passer-by in delivering UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once UAV 200 arrives at the general area of a target delivery location, UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, UAV 200 may be configured to navigate by "sourcing" such directional signals—in other words, by determining where the signal is strongest and navigating accordingly. As another example, a mobile device can emit a frequency, either in the human range or outside the human range, and UAV 200 can listen for that frequency and navigate accordingly. As a related example, if UAV 200 is listening for spoken commands, then UAV 200 could utilize spoken statements, such as "I'm over here!" to source the specific location of the person requesting delivery of a payload.

In an alternative arrangement, a navigation module may be implemented at a remote computing device, which communicates wirelessly with UAV 200. The remote computing device may receive data indicating the operational state of UAV 200, sensor data from UAV 200 that allows it to assess the environmental conditions being experienced by UAV 200, and/or location information for UAV 200. Provided with such information, the remote computing device may determine altitudinal and/or directional adjustments that should be made by UAV 200 and/or may determine how UAV 200 should adjust its mechanical features (e.g., its rudder(s), elevator(s), aileron(s), and/or the speed of its propeller(s)) in order to effectuate such movements. The remote computing system may then communicate such adjustments to UAV 200 so it can move in the determined manner.

In a further aspect, UAV 200 includes one or more communication system(s) 218. Communications system(s) 218 may include one or more wireless interfaces and/or one or more wireline interfaces, which allow UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, UAV 200 may include communication systems 218 that allow for both short-range communication and long-range communication. For example, UAV 200 may be configured for short-range communications using Bluetooth and for long-range communications under a CDMA protocol. In such an embodiment, UAV 200 may be configured to function as a "hot spot;" or in other words, as a gateway or proxy between a remote support device and one or more data networks, such as a cellular network and/or the Internet. Configured as such, UAV 200 may facilitate data communications that the remote support device would otherwise be unable to perform by itself.

For example, UAV 200 may provide a WiFi connection to a remote device, and serve as a proxy or gateway to a cellular service provider's data network, which the UAV might connect to under an LTE or a 3G protocol, for instance. UAV 200 could also serve as a proxy or gateway to a high-altitude balloon network, a satellite network, or a combination of these networks, among others, which a remote device might not be able to otherwise access.

In a further aspect, UAV 200 may include power system(s) 220. Power system(s) 220 may include one or more batteries for providing power to UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

UAV 200 may employ various systems and configurations in order to transport and deliver payload 228. In some implementations, payload 228 of UAV 200 may include or take the form of a "package" designed to transport various goods to a target delivery location. For example, UAV 200 can include a compartment, in which an item or items may be transported. Such a package may one or more food items, purchased goods, medical items, or any other object(s) having a size and weight suitable to be transported between two locations by the UAV. In other embodiments, payload 228 may simply be the one or more items that are being delivered (e.g., without any package housing the items).

In some embodiments, payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

In order to deliver the payload, the UAV may include winch system 221 controlled by tether control module 216 in order to lower payload 228 to the ground while UAV 200 hovers above. As shown in FIG. 2, winch system 221 may include tether 224, and tether 224 may be coupled to payload 228 by payload coupling apparatus 226. Tether 224 may be wound on a spool that is coupled to motor 222 of the UAV. Motor 222 may take the form of a DC motor (e.g., a servo motor) that can be actively controlled by a speed controller. Tether control module 216 can control the speed controller to cause motor 222 to rotate the spool, thereby unwinding or retracting tether 224 and lowering or raising payload coupling apparatus 226. In practice, the speed controller may output a desired operating rate (e.g., a desired RPM) for the spool, which may correspond to the speed at which tether 224 and payload 228 should be lowered towards the ground. Motor 222 may then rotate the spool so that it maintains the desired operating rate.

In order to control motor 222 via the speed controller, tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as motor 222 causes rotation of the spool, a rotary encoder may be used to measure this rotation. In doing so, the rotary encoder may be used to convert a rotary position to an analog or digital electronic signal used by tether control module 216 to determine the amount of rotation of the spool from a fixed reference angle and/or to an analog or digital electronic signal that is representative of a new rotary position, among other options. Other examples are also possible.

Based on the data from the speed sensor, tether control module 216 may determine a rotational speed of motor 222 and/or the spool and responsively control motor 222 (e.g., by increasing or decreasing an electrical current supplied to motor 222) to cause the rotational speed of motor 222 to match a desired speed. When adjusting the motor current, the magnitude of the current adjustment may be based on a proportional-integral-derivative (PID) calculation using the determined and desired speeds of motor 222. For instance, the magnitude of the current adjustment may be based on a present difference, a past difference (based on accumulated error over time), and a future difference (based on current rates of change) between the determined and desired speeds of the spool.

In some embodiments, tether control module 216 may vary the rate at which tether 224 and payload 228 are lowered to the ground. For example, the speed controller may change the desired operating rate according to a variable deployment-rate profile and/or in response to other factors in order to change the rate at which payload 228 descends toward the ground. To do so, tether control module 216 may adjust an amount of braking or an amount of friction that is applied to tether 224. For example, to vary the tether deployment rate, UAV 200 may include friction pads that can apply a variable amount of pressure to tether 224. As another example, UAV 200 can include a motorized braking system that varies the rate at which the spool lets out tether 224. Such a braking system may take the form of an electromechanical system in which motor 222 operates to slow the rate at which the spool lets out tether 224. Further, motor 222 may vary the amount by which it adjusts the speed (e.g., the RPM) of the spool, and thus may vary the deployment rate of tether 224. Other examples are also possible.

In some embodiments, tether control module 216 may be configured to limit the motor current supplied to motor 222 to a maximum value. With such a limit placed on the motor current, there may be situations where motor 222 cannot operate at the desired rate specified by the speed controller. For instance, there may be situations where the speed controller specifies a desired operating rate at which motor 222 should retract tether 224 toward UAV 200, but the motor current may be limited such that a large enough downward force on tether 224 would counteract the retracting force of motor 222 and cause tether 224 to unwind instead. A limit on the motor current may be imposed and/or altered depending on an operational state of UAV 200.

In some embodiments, tether control module 216 may be configured to determine a status of tether 224 and/or payload 228 based on the amount of current supplied to motor 222. For instance, if a downward force is applied to tether 224 (e.g., if payload 228 is attached to tether 224 or if tether 224 gets snagged on an object when retracting toward UAV 200), tether control module 216 may need to increase the motor current in order to cause the determined rotational speed of motor 222 and/or spool to match the desired speed. Similarly, when the downward force is removed from tether 224 (e.g., upon delivery of payload 228 or removal of a tether snag), tether control module 216 may need to decrease the motor current in order to cause the determined rotational speed of motor 222 and/or spool to match the desired speed. As such, tether control module 216 may be configured to monitor the current supplied to motor 222. For instance, tether control module 216 could determine the motor current based on sensor data received from a current sensor of the motor or a current sensor of power system 220. In any case, based on the current supplied to motor 222, tether control module 216 may determine if payload 228 is attached to tether 224, if someone or something is pulling on tether 224, and/or if payload coupling apparatus 226 is pressing against UAV 200 after retracting tether 224. Other examples are possible as well.

During delivery of payload 228, payload coupling apparatus 226 can be configured to secure payload 228 while being lowered from the UAV by tether 224, and can be further configured to release payload 228 upon reaching ground level. Payload coupling apparatus 226 can then be retracted to the UAV by reeling in tether 224 using motor 222.

In some implementations, payload 228 may be passively released once it is lowered to the ground. For example, a passive release mechanism may include one or more swing arms adapted to retract into and extend from a housing. An extended swing arm may form a hook on which payload 228 may be attached. Upon lowering the release mechanism and payload 228 to the ground via a tether, a gravitational force as well as a downward inertial force on the release mechanism may cause payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of payload 228 no longer forces the swing arm to extend from the housing. Retracting the swing arm into the housing may reduce the likelihood of the release mechanism snagging payload 228 or other nearby objects when raising the release mechanism toward the UAV upon delivery of payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, UAV 200 could include an air-bag drop system or a parachute drop system. Alternatively, UAV 200 carrying a payload could simply land on the ground at a delivery location. Other examples are also possible.

IV. Example UAV Deployment Systems

Figure 3:
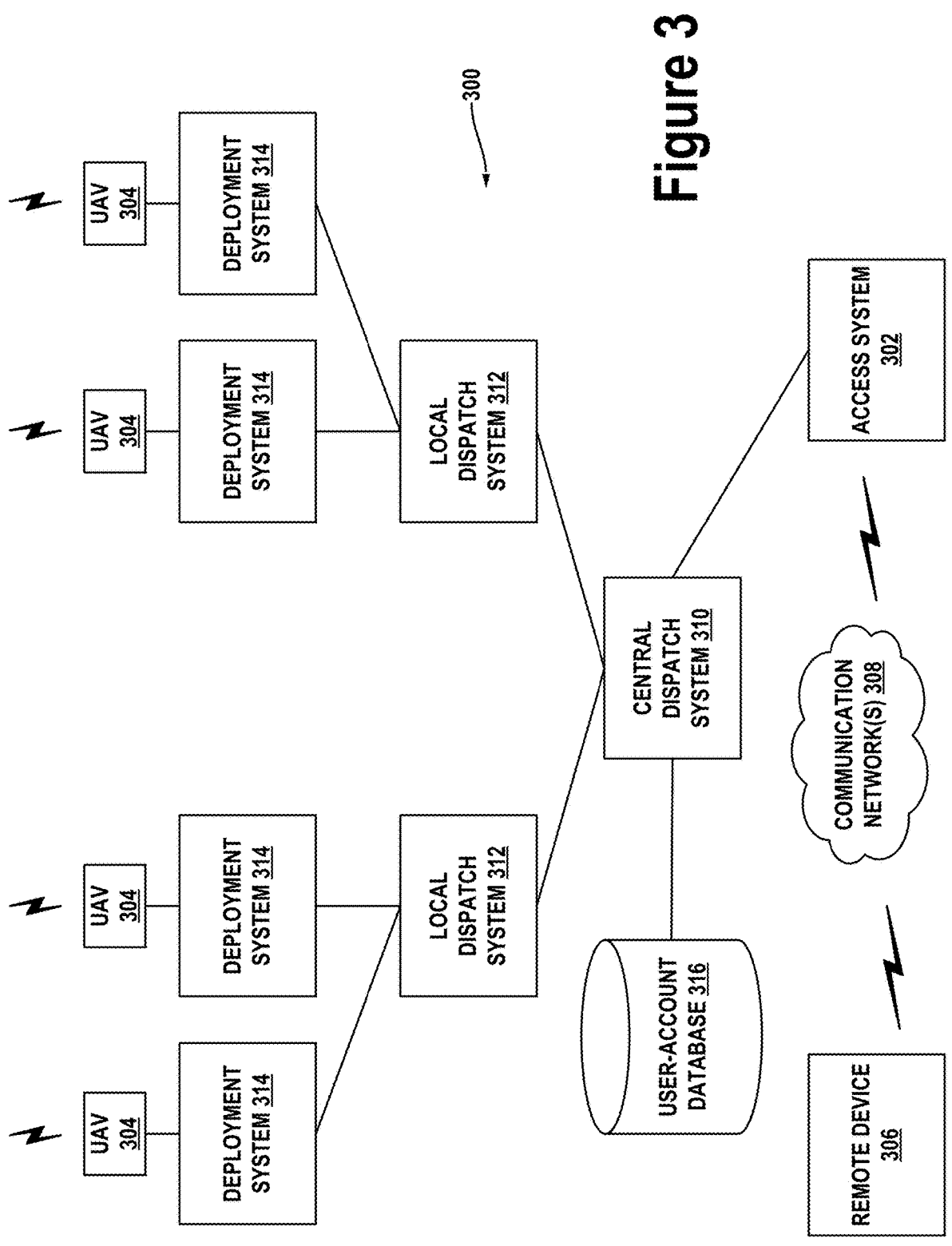
FIG. 3 is a block diagram illustrating a distributed UAV system, in accordance with examples described herein.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, access system 302 may allow for interaction with, control of, and/or utilization of a network of UAVs 304. In some embodiments, access system 302 may be a computing system that allows for human-controlled dispatch of UAVs 304. As such, the control system may include or otherwise provide a user interface through which a user can access and/or control UAVs 304.

In some embodiments, dispatch of UAVs 304 may additionally or alternatively be accomplished via one or more automated processes. For instance, access system 302 may dispatch one of UAVs 304 to transport a payload to a target location, and the UAV may autonomously navigate to the target location by utilizing various on-board sensors, such as a GPS receiver and/or other various navigational sensors.

Further, access system 302 may provide for remote operation of a UAV. For instance, access system 302 may allow an operator to control the flight of a UAV via its user interface. As a specific example, an operator may use access system 302 to dispatch one of UAVs 304 to a target location. The dispatched UAV may then autonomously navigate to the general area of the target location. At this point, the operator may use access system 302 to take control of the dispatched UAV and navigate the dispatched UAV to the target location (e.g., to a particular person to whom a payload is being transported). Other examples of remote operation of a UAV are also possible.

In an illustrative embodiment, UAVs 304 may take various forms. For example, each of UAVs 304 may be a UAV such as those illustrated in FIG. 1A, 1B, 1C, 1D, 1E, or 2. However, UAV system 300 may also utilize other types of UAVs without departing from the scope of the invention. In some implementations, all of UAVs 304 may be of the same or a similar configuration. However, in other implementations, UAVs 304 may include a number of different types of UAVs. For instance, UAVs 304 may include a number of types of UAVs, with each type of UAV being configured for a different type or types of payload delivery capabilities.

UAV system 300 may further include remote device 306, which may take various forms. Generally, remote device 306 may be any device through which a direct or indirect request to dispatch a UAV can be made. Note that an indirect request may involve any communication that may be responded to by dispatching a UAV, such as requesting a package delivery. In an example embodiment, remote device 306 may be a mobile phone, tablet computer, laptop computer, personal computer, or any network-connected computing device. Further, in some instances, remote device 306 may not be a computing device. As an example, a standard telephone, which allows for communication via plain old telephone service (POTS), may serve as remote device 306. Other types of remote devices are also possible.

Further, remote device 306 may be configured to communicate with access system 302 via one or more types of communication network(s) 308. For example, remote device 306 may communicate with access system 302 (or a human operator of access system 302) by communicating over a POTS network, a cellular network, and/or a data network such as the Internet. Other types of networks may also be utilized.

In some embodiments, remote device 306 may be configured to allow a user to request pick-up of one or more items from a certain source location and/or delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, UAV system 300 may receive location information (e.g., GPS coordinates, etc.) from the user's mobile phone, or any other device on the user's person, such that a UAV can navigate to the user's location (as indicated by their mobile phone).

In an illustrative arrangement, central dispatch system 310 may be a server or group of servers, which is configured to receive dispatch messages requests and/or dispatch instructions from access system 302. Such dispatch messages may request or instruct central dispatch system 310 to coordinate the deployment of UAVs to various target locations. Central dispatch system 310 may be further configured to route such requests or instructions to one or more local dispatch systems 312. To provide such functionality, central dispatch system 310 may communicate with access system 302 via a data network, such as the Internet or a private network that is established for communications between access systems and automated dispatch systems.

In the illustrated configuration, central dispatch system 310 may be configured to coordinate the dispatch of UAVs 304 from a number of different local dispatch systems 312. As such, central dispatch system 310 may keep track of which ones of UAVs 304 are located at which ones of local dispatch systems 312, which UAVs 304 are currently available for deployment, and/or which services or operations each of UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when central dispatch system 310 receives a request for UAV-related service (e.g., transport of an item) from access system 302, central dispatch system 310 may select a specific one of UAVs 304 to dispatch. Central dispatch system 310 may accordingly instruct local dispatch system 312 that is associated with the selected UAV to dispatch the selected UAV. Local dispatch system 312 may then operate its associated deployment system 314 to launch the selected UAV. In other cases, central dispatch system 310 may forward a request for a UAV-related service to one of local dispatch systems 312 that is near the location where the support is requested and leave the selection of a particular one of UAVs 304 to local dispatch system 312.

In an example configuration, local dispatch system 312 may be implemented as a computing system at the same location as deployment system(s) 314 that it controls. For example, a particular one of local dispatch system 312 may be implemented by a computing system installed at a building, such as a warehouse, where deployment system(s) 314 and UAV(s) 304 that are associated with the particular one of local dispatch systems 312 are also located. In other embodiments, the particular one of local dispatch systems 312 may be implemented at a location that is remote to its associated deployment system(s) 314 and UAV(s) 304.

Numerous variations on and alternatives to the illustrated configuration of UAV system 300 are possible. For example, in some embodiments, a user of remote device 306 could request delivery of a package directly from central dispatch system 310. To do so, an application may be implemented on remote device 306 that allows the user to provide information regarding a requested delivery, and generate and send a data message to request that UAV system 300 provide the delivery. In such an embodiment, central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to central dispatch system 310, local dispatch system(s) 312, access system 302, and/or deployment system(s) 314 may be combined in a single system, implemented in a more complex system (e.g., having more layers of control), and/or redistributed among central dispatch system 310, local dispatch system(s) 312, access system 302, and/or deployment system(s) 314 in various ways.

Yet further, while each local dispatch system 312 is shown as having two associated deployment systems 314, a given local dispatch system 312 may alternatively have more or fewer associated deployment systems 314. Similarly, while central dispatch system 310 is shown as being in communication with two local dispatch systems 312, central dispatch system 310 may alternatively be in communication with more or fewer local dispatch systems 312.

In a further aspect, deployment systems 314 may take various forms. In some implementations, some or all of deployment systems 314 may be a structure or system that passively facilitates a UAV taking off from a resting position to begin a flight. For example, some or all of deployment systems 314 may take the form of a landing pad, a hangar, and/or a runway, among other possibilities. As such, a given deployment system 314 may be arranged to facilitate deployment of one UAV 304 at a time, or deployment of multiple UAVs (e.g., a landing pad large enough to be utilized by multiple UAVs concurrently).

Additionally or alternatively, some or all of deployment systems 314 may take the form of or include systems for actively launching one or more of UAVs 304. Such launch systems may include features that provide for an automated UAV launch and/or features that allow for a human-assisted UAV launch. Further, a given deployment system 314 may be configured to launch one particular UAV 304, or to launch multiple UAVs 304.

Note that deployment systems 314 may also be configured to passively facilitate and/or actively assist a UAV when landing. For example, the same landing pad could be used for take-off and landing. Deployment system 314 could also include other structures and/or systems to assist and/or facilitate UAV landing processes.

Deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, local dispatch systems 312 (along with their respective deployment system(s) 314 may be strategically distributed throughout an area such as a city. For example, local dispatch systems 312 may be strategically distributed such that each local dispatch systems 312 is proximate to one or more payload pickup locations (e.g., near a restaurant, store, or warehouse). However, local dispatch systems 312 may be distributed in other ways, depending upon the particular implementation.

As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, UAV system 300 may include or have access to user-account database 316. User-account database 316 may include data for a number of user accounts, and which are each associated with one or more person. For a given user account, user-account database 316 may include data related to or useful in providing UAV-related services. Typically, the user data associated with each user account is optionally provided by an associated user and/or is collected with the associated user's permission.

Further, in some embodiments, a person may be required to register for a user account with UAV system 300, if they wish to be provided with UAV-related services by UAVs 304 from UAV system 300. As such, user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone to, e.g., place a call to an operator of access system 302 or send a message requesting a UAV-related service to a dispatch system, the phone may be identified via a unique device identification number, and the call or message may then be attributed to the associated user account. Other examples are also possible.

V. Example Aerial Path Generation a. Aerial Path System

Figure 4:
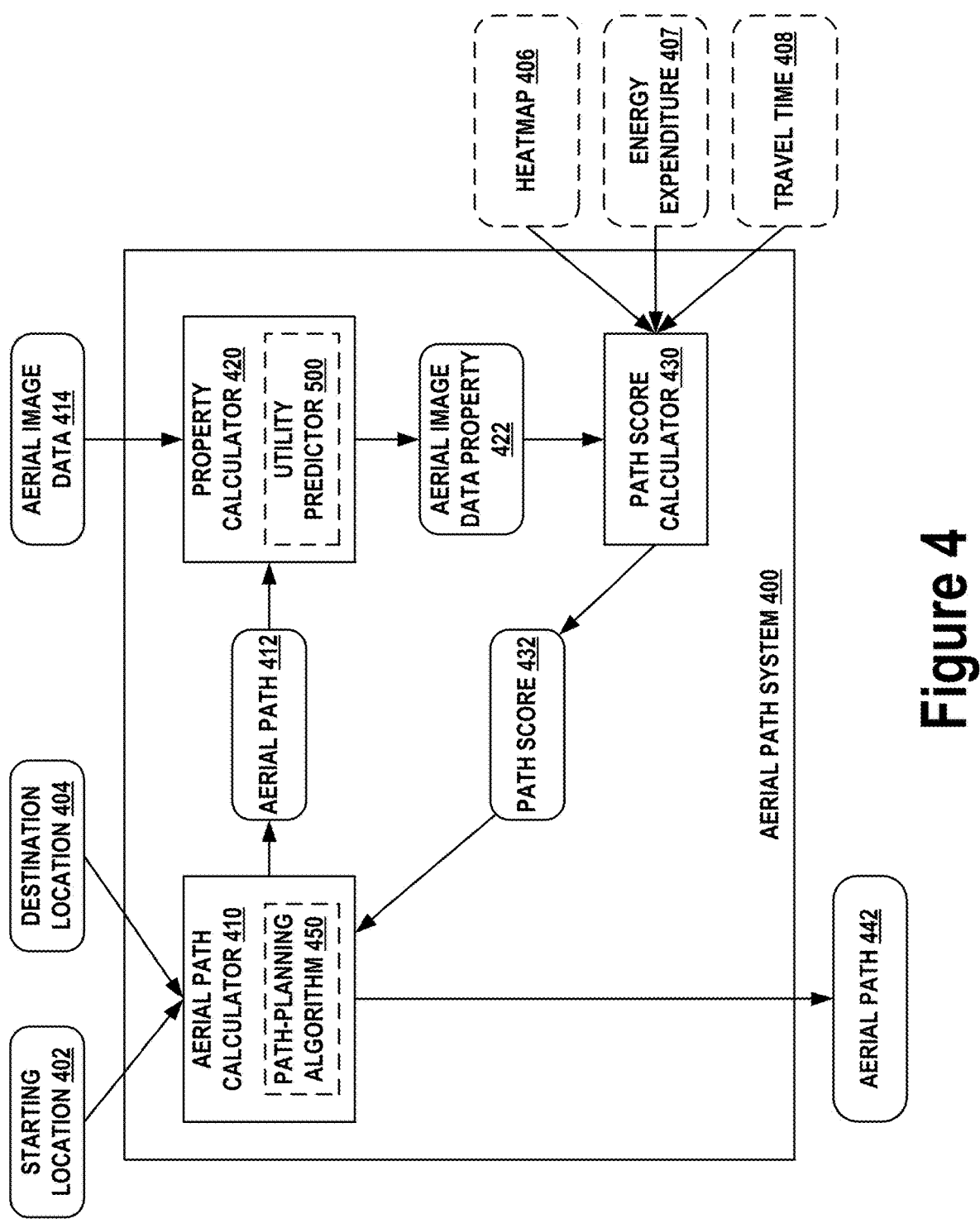
FIG. 4 illustrates an aerial path system, in accordance with examples described herein.

FIG. 4 illustrates an example aerial path system 400. Aerial path system 400 may be configured to generate aerial path 442 based on starting location 402, destination location 404, and aerial image data 414. In some cases, aerial path system 400 may be configured to generate aerial path 442 based further on heatmap 406, energy expenditure 407, and/or travel time 408. Aerial path system 400 may include aerial path calculator 410, property calculator 420, path score calculator 430, and in some cases, path-planning algorithm 450 and/or utility predictor 500. Aerial path system 400 may be implemented using hardware, software, or a combination thereof.

Starting location 402 and destination location 404 may be represented as map markers, satellite-based coordinates (e.g., GPS coordinates), graphical icons, and/or textual descriptions, among other possibilities. In some cases, starting location 402 and destination location 404 may mark the beginning and end, respectively, of a travel task for an aerial vehicle. In other cases, starting location 402 and destination location 404 may mark the beginning and end, respectively, of a section of the travel task of the aerial vehicle.

Aerial path calculator 410 may be configured to calculate aerial path 412 and/or aerial path 442 based on starting location 402 and destination location 404. The operations of aerial path calculator 410 may include obtaining, selecting, determining, calculating, and/or modifying aerial paths 412 and/or 442, among other possibilities.

For example, aerial path calculator could obtain aerial path 412 and/or 442 from a database of predetermined aerial paths from starting location 402 to destination location 404. As another example, aerial path 412 and/or 442 could be determined based on sensor data (e.g., from UAV 200) that represents a tracked position of an aerial vehicle. Aerial path calculator 410 may also be configured to select aerial path 412 and/or 442 from a plurality of aerial paths. For instance if multiple aerial paths are obtained, determined, and/or calculated, aerial path calculator 410 may select aerial path 442 based on path score 432 for each respective aerial path.

Aerial path calculator 410 may be configured to calculate and/or determine aerial path 412 and/or 442. For example, aerial path calculator 410 may use path-planning algorithm 450 to calculate and/or determine aerial path 412 and/or 442 based on path score 432. Path-planning algorithm 450 may use an iterative optimization, a cost function, and/or heuristics when determining aerial path 412 and/or 442. Example cost functions that could be used implicitly and/or explicitly by path-planning algorithm 450 may consider various factors and/or constraints, such as distance, travel time, obstacles, regulatory compliance, and/or aerial image data property 422, among other possibilities. In some cases, each of these factors and/or constraints may have a weight or coefficient assigned to it, where a total cost is a weighted sum of a plurality of factors and/or constraints. In other examples, more complex cost functions may be used, such as non-linear cost functions, multi-objective cost functions, dynamic cost functions, and/or learning-based cost functions. In some examples, weights could be determined on a per-path and/or per-mission basis.

Path-planning algorithm 450 may include and/or be based on, for example, Dijkstra's algorithm, A* algorithm, dynamic programming, ant colony optimization (ACO), and/or a rapidly exploring random tree (RRT), among various other possibilities. Dijkstra's algorithm is a path-planning algorithm that finds a shortest path between nodes in a graph (e.g., between intermediate waypoints/locations that form part of an aerial path), and operates by iteratively selecting the node with a lower and/or lowest total cost (sum of edge costs) from the starting location 402 until the destination location 404 is reached. A* is another path-planning algorithm that combines Dijkstra's algorithm and greedy best-first search. A* uses a heuristic function to estimate the cost of reaching destination location 404 from each node/intermediate waypoint. The cost function in A* is typically a combination of the actual cost (e.g., distance traveled) and the heuristic estimate (e.g., straight-line distance to destination location 404). A* aims to reduce the total estimated cost.

Dynamic programming techniques can be applied to path-planning problems with overlapping sub-problems, such as the shortest-path problem in a grid or network (e.g., in a tiled environment over which different aerial paths could travel). These algorithms typically use a cost function to determine a best and/or relatively better path by considering the cumulative cost of reaching each cell or node in the grid. In ACO, artificial ants construct solutions by probabilistically selecting paths based on heuristic information. The cost function in ACO represents the desirability of each path.

RRTs can construct a space-filling tree incrementally from randomly drawn samples from the search space (e.g., where samples are waypoints along an aerial path where a next waypoint is selected from possible next waypoints). Each sample (e.g., waypoint) represents a potential configuration or state (e.g., the aerial path or portion of the aerial path) in the search space. The algorithm attempts to connect each sample to the nearest existing state in the tree, checking for feasibility (i.e., whether the connection is entirely through free space and obeys any constraints). If feasible, the new state (e.g., the aerial path plus the newest waypoint) is added to the tree. RRT may favor expanding towards unexplored regions and can handle obstacles and constraints. By limiting connection lengths and biasing sampling towards specific areas, such as goal configurations (e.g., towards waypoints in environments that may improve navigation based on VIO and/or semantic localization), RRTs may generate open-loop trajectories and approximate control policies for nonlinear systems.

Additionally or alternatively, path-planning algorithm 450 may be based on a UAV-specific path-planning algorithm, such as the one described in a paper titled "An Autonomous Path Planning Method for Unmanned Aerial Vehicle based on A Tangent Intersection and Target Guidance Strategy" authored by Liu et al. and published as arXiv:2006.04103, which is incorporated herein by reference.

Path-planning algorithm 450 may use machine learning techniques, such as the ones described in a paper titled "Path Planning using Neural A* Search" authored by Yonetani et al. and published as arXiv:2009.07476, which is incorporated herein by reference.

Aerial path 442 and/or aerial path 412 may each represent a trajectory from starting location 402 to destination location 404. For example, aerial paths 412 and/or 442 may be represented as a line, arrow, waypoint sequence, curve, and/or spline on a map. The map could be represented as, for example, a digital image. As another example, aerial paths 412 and/or 442 may be represented by using satellite-based coordinates, such as GPS coordinates, for different points along aerial paths 412 and/or 442. Aerial paths 412 and/or 442 could be stored in a format such as GPS exchange format (GPX) and/or keyhole markup language (KML), among other possible formats. Aerial paths 412 and/or 442 may also be represented as a 3D visualization over an environment. Thus, aerial paths 412 and/or 442 may represent a latitude, longitude, and altitude for different points along aerial paths 412 and/or 442. Additionally or alternatively, aerial paths 412 and/or 442 could include a set of instructions, such as text-based directions and/or program code that could be implemented and/or executed to direct an aerial vehicle (e.g., UAV 200) along aerial paths 412 and/or 442. Aerial path 442 may be based on aerial path 412, and/or may represent a version of aerial path 412 that may have been modified by the operations of aerial path system 400.

Property calculator 420 may be configured to determine aerial image data property 422 based on aerial path 412 and aerial image data 414. Aerial image data property 422 may be a property of aerial image data 414, where aerial image data 414 is obtainable using an aerial vehicle while traversing aerial path 412. Aerial image data 414 may be selected by aerial path system 400 based on aerial path 412 (e.g., based on spatial, temporal, and/or environmental conditions associated with aerial path 412). Thus, aerial image data 414 may represent an environment along aerial path 412. Aerial image data 414 may be based on and/or represent aerial images captured as part of prior flights by one or more aerial vehicles. Aerial image data 414 may thus represent visual features that, absent substantial changes in the physical composition of the environment along aerial path 412 since the prior flights, the aerial vehicle may be expected to observe while traversing aerial path 412. Aerial image data

414 may be obtainable at least in that aerial path system 400 may expect and/or predict that the aerial vehicle will be able to capture aerial image data 414 at a future time while traversing aerial path 412.

The term "property of aerial image data" (or equivalently, "aerial image data property") may refer to a property/attribute of aerial image data (e.g., a size, a number of features detectable therein, a color, a resolution, a location of capture, etc.) and a corresponding value of the property/attribute, and/or the corresponding value of the property/attribute. For example, if an aerial image has a resolution of 500×500 pixels, a property of that aerial image data may include the value of the property/attribute of "size," i.e., "500×500 pixels." Additionally or alternatively, the term "property of aerial image data" could indicate whether the corresponding value of the property/attribute matches a target value and/or target value range for the property/attribute (e.g., whether the aerial image data exhibits a desired and/or desirable property/attribute for a particular application). For instance, if 500×500 pixels is a desired size of the aerial image data, a property of that aerial image data could be "exact size match," indicating that the actual size of the aerial image data matches the desired size. Thus, unless context suggests otherwise, the term "property of aerial image data" may refer to a property/attribute of aerial image data along with its corresponding value, the corresponding value for the property/attribute by itself, and/or an indication of whether the corresponding value matches a target value for the property/attribute.

In some examples, property calculator 420 may be configured to determine, based on aerial path 412 and/or aerial image data 414, multiple properties of aerial image data 414. Thus, aerial image data property 422 may refer to one or more properties of aerial image data 414.

Property calculator 420 may be configured to determine aerial image data property 422 based on an objective associated with aerial path system 400. For example, an objective could be to preserve the health and/or viability of a secondary (e.g., vision-based) navigation system of the aerial vehicle, in which case property calculator 420 may determine aerial image data property 422 to provide a quantitative measure of visual features expected to be detectable in aerial image data 414. In some cases, the quantitative measure may be indicative of a usability of aerial image data 414 for controlling the aerial vehicle. For instance, aerial image data property 422 could include a "number of visual features in the aerial image data," a "uniqueness of visual features in the aerial image data," a "utility of aerial image data for VIO," and/or a "utility of aerial image data for semantic localization," among other possibilities.

Property calculator 420 may be configured to employ utility predictor 500, for example to estimate and/or predict a utility of aerial image data 414 for meeting the objective. Utility predictor 500 is described in more detail below in connection with FIG. 5.

In some cases, aerial image data property 422 may include a predicted utility of aerial image data 414 for navigating the aerial vehicle in the environment using VIO. As discussed above, VIO may be used to estimate the pose (i.e., position and/or orientation) of an aerial vehicle based on data from visual sensors (such as cameras). In some cases, VIO may also involve using data from inertial sensors (such as accelerometers and gyroscopes). Specifically, performing VIO may include capturing two or more aerial images of an environment and identifying, within each of these images, one or more visual features that are common to (i.e., present in both) of the two or more aerial images. Based on (i) an amount of apparent displacement of the one or more visual features between the two or more images and (ii) a difference in the respective capture times of the two or more images, one or more properties of motion of the aerial vehicle may be estimated.

In environments with distinct visual features, such as neighborhoods with diverse houses, aerial image data 414 captured by visual sensors may provide reference points for the aerial vehicle to estimate its pose and/or motion. For example, the presence of multiple landmarks and/or structures may enable the aerial vehicle to determine its direction, distance, speed, and/or acceleration of motion. Conversely, in environments with fewer distinctive features, such as aerial paths over vast bodies of water like the ocean, aerial image data 414 may primarily include uniform expanses of blue sky and/or water with few discernible features. In such cases, the absence of distinctive visual cues might make pose and/or motion estimations more challenging for VIO navigation, potentially reducing its effectiveness.

As such, examples of aerial image data property 422 in the VIO context may include numbers and/or densities of visual features (e.g., shapes and/or edges), image quality (e.g., resolution, blurriness), and/or continuity of visual features from one aerial image to another, among other possibilities. That is, aerial image data property 422 may quantify (e.g., numerically) how useful aerial image data 414 is likely to be for performing VIO along and/or around aerial path 412.

In some cases, aerial image data property 422 may include a predicted utility of aerial image data 414 for semantic localization of the aerial vehicle in the environment. As discussed above, semantic localization involves estimating an aerial vehicle's location based on semantic information extracted from aerial image data 414. This approach involves identifying and understanding the features present in aerial image data 414 to determine the aerial vehicle's position relative to its surroundings. Semantic localization may rely on low-level visual features (e.g., geometric features, such as blobs and/or edges), and higher-level semantic understanding of the environment (e.g., recognizing specific buildings or structures, such as landmarks).

For semantic localization to be effective, it may be beneficial for aerial image data 414 to contain visual features (e.g., objects, structures, landmarks, etc.) that can be recognized and unambiguously matched to known reference maps and/or models of the environment. For example, if the aerial vehicle flies over a landmark like the Eiffel Tower, semantic localization algorithms can leverage this information to estimate the aerial vehicle's location relative to the landmark. In the case of flying over the Eiffel Tower, semantic localization could involve matching the aerial image data captured by the aerial vehicle with reference maps or models of Paris that include the location of the Eiffel Tower. By identifying distinctive features in the images that correspond to the Eiffel Tower, semantic localization algorithms can determine the aerial vehicle's location relative to this recognizable landmark (e.g., unambiguously localize the aerial vehicle relative to the Eiffel Tower).

While landmarks such as the Eiffel Tower may be used in semantic localization, it is also possible to use other visual features and/or combinations thereof to perform semantic localization. The Eiffel Tower case is meant to represent an example, and it will be understood that other methods for semantic localization are possible and contemplated. For example, if a forest contains many Pine trees that are not individually unique and/or distinguishable, but a subset of the Pine trees are growing in a heart-shaped pattern, semantic localization could detect and recognize the heart-shaped pattern to determine the location of the aerial vehicle. As another example, in a farming community with many grass fields, a patch of grass might not be unique and/or useful for semantic localization. However, in an urban environment with few parks, a grass field might be unique and useful for semantic localization, possibly in combination with other surrounding visual features. Thus, the relative uniqueness and/or utility of visual features for semantic localization may be context and/or environment-dependent.

As such, examples of aerial image data property 422 in the semantic localization context may include a number and/or a density of detectable features (e.g., a number and/or density of recognizable features, where features that are recognizable are a subset of those that are detectable), a uniqueness of visual features, and/or a semantic meaning extractable from aerial image data 414, among other possibilities. That is, aerial image data property 422 may quantify (e.g., numerically) how useful aerial image data 414 is likely to be for performing semantic localization along and/or around aerial path 412.

Other examples of aerial image data property 422 that property calculator 420 may be configured to output include color distribution and/or diversity, texture richness and/or complexity, illumination variance, motion blur detection, scene semantics, environmental hazards detection, and/or object recognition confidence, among other possibilities. Color distribution and/or diversity may characterize the variety and/or distribution of colors present in the images, and may aid feature detection and segmentation. Texture richness and/or complexity may measure the variability of textures observed, and may influence the discriminative power of texture-based features for navigation. Illumination variance may quantify lighting changes, and may improve feature detection robustness. Motion blur detection may identify blur severity, and may affect motion estimation accuracy. Scene semantics may capture high-level scene information, and may aid in contextual understanding. Environmental hazards detection may flag potential obstacles, and may support collision avoidance. Object recognition confidence may provide a numerical measurement representing a likelihood that output of an object detection, classification, and/or other image processing operation is correct, and may help guide navigation decisions.

In some cases, aerial image data property 422 may be obtained by property calculator 420, e.g., from a database of aerial image data properties. In some cases, aerial image data property 422 may be provided to property calculator 420, for example by another system and/or a user input.

Path score calculator 430 may be configured to determine, based on aerial image data property 422, path score 432 associated with aerial path 412. Path score calculator 430 may include a function and/or equation configured to generate path score 432. For example, path score calculator 430 may implement the function S=f(A, B, C, . . . ), where S represents path score 432, f( ) is a function that may include linear and/or non-linear terms, A represents VIO utility (e.g., VIO utility value 512 in the context of FIG. 5) of aerial image data 414, B represents semantic localization utility (e.g., semantic localization utility value 522 in the context of FIG. 5) of aerial image data 414, C represents energy expenditure 407, and the ellipsis denotes other potential inputs.

Path score calculator 430 may be configured to take input parameters (such as A, B, and C above). These parameters may vary depending on aerial path 412 and/or other considerations, such as an availability of data or a configuration setting. Each input parameter may be assigned a weighting factor to indicate its relative importance in the calculation of path score 432. For example, if energy expenditure 407 is more important than travel time 408, energy expenditure 407 could be assigned a higher weighting factor.

Path score 432 may be represented in various formats. For example, path score 432 may be represented using one or more numeric values (e.g., a numerical score ranging from a minimum to a maximum value) and/or categorical values (e.g., a category representing a corresponding range of numerical values). Alternatively or additionally, path score 432 may be depicted using one or more visual aids such as color gradient(s), bar graph(s), and/or line graph(s). Symbols and/or icons along aerial path 412 may also indicate path score 432, with variations in size and/or color conveying different score levels. Other possibilities exist.

Path score 432 may be a score associated with aerial path 412 and/or a portion of aerial path 412. Additionally or alternatively, path score 432 could be associated with the environment along an aerial path. As an example, an aerial path from Paris to London that goes over the Eiffel Tower could have a score of 8/10 and an aerial path from Paris to London that does not go over the Eiffel Tower could have a score of 7/10, suggesting that the aerial path that goes over the Eiffel Tower is more beneficial for some criteria or constraint (e.g., for semantic localization, since the Eiffel Tower is a unique feature). In both cases, path score 432 is associated with the aerial path as a whole. As another example, an aerial path representing a segment of the aerial path above the Eiffel Tower could receive a score of 9/10.

Path score calculator 430 may also be configured to use heatmap 406, energy expenditure 407 and/travel time 408, each of which may be associated with aerial path 412, aerial image data 414, and/or aerial image data property 422. For example, aerial path 412 may have relatively useful aerial image data 414, but if aerial path 412 has energy expenditure 407 that is greater than the aerial vehicle's battery capacity, path score 432 may be relatively low and/or zero.

Heatmap 406 may represent a plurality of planned aerial paths from starting location 402 to destination location 404 and a plurality of actual aerial paths from starting location 402 to destination location 404. For example, if an aerial vehicle flies ten times between London and Paris along two different planned aerial paths (e.g., five along each), heatmap 406 could include the two planned aerial paths and the ten actual aerial paths. Path score calculator 430 may be further configured to determine a difference between the plurality of planned aerial paths and the plurality of actual aerial paths, and calculate path score 432 based on the difference. For example, if the aerial vehicle deviated substantially on most actual aerial paths when it was supposed to be taking the first planned aerial path, but did not deviate substantially when it was supposed to be taking the second aerial path, path score calculator 430 could score the planned aerial paths to represent that the first planned aerial path is less reliable and/or more susceptible to navigational challenges than the second planned aerial path.

In some examples, heatmap 406, such as the one described above, could be used to detect environments where a primary navigation system of an aerial vehicle is less likely to perform well, e.g., by identifying areas where actual aerial paths deviate from planned aerial paths. For example, in an environment that is expected to have weak satellite-based navigation, path score calculator could weight factors associated with relatively strong secondary navigation systems more heavily. For instance, the number of visual features expected to be detectable in aerial image data 414 may be deemed more relevant and thus assigned a larger weight and/or relative score.

Heatmap 406, energy expenditure 407, and/or travel time 408 may represent a value or input (e.g., a heatmap as above, a travel time such as "one hour," an energy expenditure such as "1 kWh"). Additionally or alternatively, heatmap 406, energy expenditure 407, and/or travel time 408 may include a sub-score associated with the value or input. For instance, if a travel time (e.g., 1 hour) for an aerial path exceeds a desired travel time (e.g., 30 minutes), travel time 408 could represent a relatively low sub-score associated with the travel time (e.g., of 1 hour). As another example, if an energy expenditure is less than a battery capacity for an aerial vehicle, energy expenditure 407 could represent a relatively high sub-score of the energy expenditure.

In some examples, aerial path calculator 410 may be configured to determine a plurality of aerial paths from starting location 402 to destination location 404. The plurality of aerial paths may be represented by a plurality of instances of aerial path 412. For each respective instance of aerial path 412, a corresponding aerial image data property 422 of aerial image data 414 that (i) is obtainable using the aerial vehicle while traversing the respective instance of aerial path 412 and (ii) represents a corresponding environment along the respective instance of aerial path 412 may be determined (e.g., by property calculator 420). For each respective instance of aerial path 412 and based on the corresponding aerial image data property 422, a corresponding path score 432 associated with the respective instance of aerial path 412 may be determined (e.g., by path score calculator 430). Outputting aerial path 442 may include selecting (e.g., by aerial path calculator 410) aerial path 442 from the plurality of aerial paths based on the corresponding path score of each respective instance of aerial path 412.

As one example, aerial path calculator 410 could calculate two aerial paths from starting location 402 to destination location 404, one of which traverses over a neighborhood with many different houses and the other of which goes over an ocean. Property calculator 420 could calculate a "number of distinguishable features" property for each path's respective aerial image data 414. Path score calculator 430 could calculate that aerial image data 414 from the aerial path over the neighborhood includes many distinguishable features and assign a score of X, where X is a numerical value (e.g., "10"). Likewise, path score calculator 430 could calculate that aerial image data 414 from the aerial path over the ocean includes few distinguishable features, and assign a score of Y, where Y is a numerical value smaller than X (e.g., "3"). Accordingly, aerial path calculator 410 could output aerial path 442 that goes over the neighborhood rather than over the ocean.

In some examples, aerial path calculator 410 may be configured to provide, as input to a path-planning algorithm (e.g., path-planning algorithm 450) (i) the starting location 402, (ii) the destination location 404, and (iii) a representation of a function configured to determine path score 432. Path-planning algorithm 450 may be configured to determine aerial path 412 and/or 442 based on starting location 402, destination location 404, and the function. Aerial path calculator 410 may be configured to evaluate, in connection with path-planning algorithm 450, the function based on aerial image data property 422. Thus, in some cases, property calculator 420, and/or path score calculator 430 may form part of path-planning algorithm 450, and thus path-planning algorithm 450 may perform at least some of the operations discussed in connection with property calculator

420 and/or path score calculator 430. For example, path score calculator 430 may implicitly and/or explicitly be represented by the function configured to determine the path score.

As one example, starting location 402 and destination location 404 could be provided to aerial path calculator 410. Path-planning algorithm 450 could be Dijkstra's algorithm, which finds a shortest path between locations (points) by iteratively selecting an intermediate waypoint with a lower and/or lowest total cost from starting location 402, until destination location 404 is reached. A representation of a function could be provided to Dijkstra's algorithm to calculate path cost, where the function represents the distance between intermediate waypoints minus a value representing aerial image data property 422 between those waypoints (such that larger distances are assigned a higher cost, but can be offset by high-scoring aerial image data 414). Thus, aerial path system 400 may dynamically generate aerial path 442 by implicitly or explicitly considering aerial image data property 422 and path score 432.

In some examples, aerial path calculator 410 may be configured to consider aerial image data property 422 and/or path score 432 as direct and/or indirect factors in a cost function. For example, an environment along an aerial path could be discretized into cells of a grid, each of which could be assigned a score based on a property of aerial image data obtainable over the tile. Then, path-planning algorithm 450 could traverse the tiled environment to construct a highest-scoring and/or a relatively higher-scoring complete aerial path.

In some examples, aerial path calculator 410 may be configured to modify an aerial path based on a path score for the aerial path. For instance, aerial path 412 could be modified based on path score 432 to define aerial path 442. For instance, aerial path calculator 410 may obtain aerial path 412, which could have been generated to provide a relatively short travel time. However, if path score 432 for aerial path 412 is relatively low (e.g., aerial path 412 travels over a body of water), aerial path calculator 410 could modify aerial path 412 to reduce travel over the portions of the environment that cause the relatively low path score 432.

In some examples, aerial path system 400 may be configured to receive additional aerial image data representing the environment along aerial path 412 and/or 442, where the additional aerial image data has been obtained using the aerial vehicle while the aerial vehicle traverses the aerial path. For example, if an aerial vehicle is flying along aerial path 442, the aerial vehicle could provide aerial path system 400 with live aerial image data. Aerial path system 400 may be configured to determine, based on original aerial image data associated with aerial path 412 and/or 412 and the additional aerial image data, a difference between the aerial image data and the additional aerial image data.

For example, if a planned aerial path from London to Paris traveled over the Eiffel tower at a certain time, but the additional aerial image data received from the aerial vehicle at that time includes the London Eye, aerial path system 400 may detect a difference between the planned aerial path and the actual aerial path. Accordingly, aerial path system 400 may be configured to modify the planned aerial path and/or generate a new aerial path based on the difference. For example, the aerial vehicle could use semantic localization to determine that it is over the London Eye, and then receive an updated flight path from the London Eye (where it is) to a point that is on the original planned aerial path. This adaptive flight planning may be useful if an aerial vehicle is detected to be off-course and/or if new information about an aerial path are received, such as weather data, potential collisions, airspace regulations, etc. These adaptive flight planning steps as described above, and other possible operations, may be performed by aerial path calculator 410, property calculator 420 (e.g., to determine "detected weather" as aerial image data property 422), and/or path score calculator 430.

In some examples, aerial path generator 400 may be configured to generate aerial paths 412 and/or 442 based on additional or alternative causes of visual variation in an appearance of the environment and/or changes to the environment. The visual variation in the appearance of the environment could include spatio-temporal condition(s), such as time of day, time of year, weather, and/or seasonal conditions, among other possibilities. For example, aerial path 442 may be relatively high-scoring for VIO use during the day, and thus have a relatively high path score 432 for day flights. However, if some visual features along aerial path 442 are more difficult to detect when it is dark out, aerial path 442 may have a relatively lower path score 432 for night flights. As another example, if aerial path 442 provides unique visual features during the summer (e.g., different-colored roofs in a rural farm area), aerial path 442 may have a relatively high path score 432 for flights during the summer. However, if aerial path 442 provides fewer unique visual features during the winter (e.g., if the roofs and fields are all covered in white snow), aerial path 442 may have a relatively lower path score 432 during the winter.

Further changes to the environment could include effects by the spatio-temporal condition(s), as well as other factors (e.g., restrictions or regulations on aerial paths). For instance, if aerial image data 414 is relatively-high scoring for VIO and/or semantic localization, but aerial path 442 traverses a no-fly zone, aerial path 442 may be associated with a relatively lower path score 432.

In some examples, property calculator 420 may be configured to generate aerial image data property 422 based on additional or alternative causes of visual variation in an appearance of the environment and/or changes to the environment. Accordingly, aerial image data property 422 may be based on (i) baseline and/or condition-neutral aerial image data 414 and/or (ii) aerial image data 414 that represents spatio-temporal conditions expected to be encountered by the aerial vehicle while traversing aerial path 412 (e.g., thus representing more current, timely, and/or accurate visual conditions). Thus, aerial image data property 422 may indicate the extent to which the spatio-temporal conditions associated with aerial path 412 allow for detection of various visual features to be used for vision-based navigation. An example of baseline aerial image data could include aerial image data that is aggregated, combined, and/or averaged over a period of time (e.g., overlaid aerial images from multiple aerial flights). An example of aerial image data that represents spatio-temporal conditions could include recently-obtained aerial image data (e.g., from an aerial vehicle currently traversing the aerial path).

In some examples, path score calculator 430 may be configured to generate path score 432 based on additional or alternative causes of visual variation in an appearance of the environment and/or changes to the environment. In some further examples, path score calculator 430 may receive aerial image data property 422 that corresponds to baseline and/or condition-neutral aerial image data 414 (e.g., aerial image data from an average day and/or time of day). For example, aerial image data property 422 for aerial image data 414 could correspond to an average day, and path score calculator 430 could consider weather conditions (e.g., a blizzard) to adjust path score 432 based on an impact of the weather conditions on aerial image data 414. Thus, path score calculator 430 may consider the extent to which the spatio-temporal conditions associated with aerial path 412 are expected to affect aerial image data property 422, and thus the extent to which these spatio-temporal conditions are expected to allow for detection of various visual features to be used for vision-based navigation.

b. Utility Predictor

Figure 5:
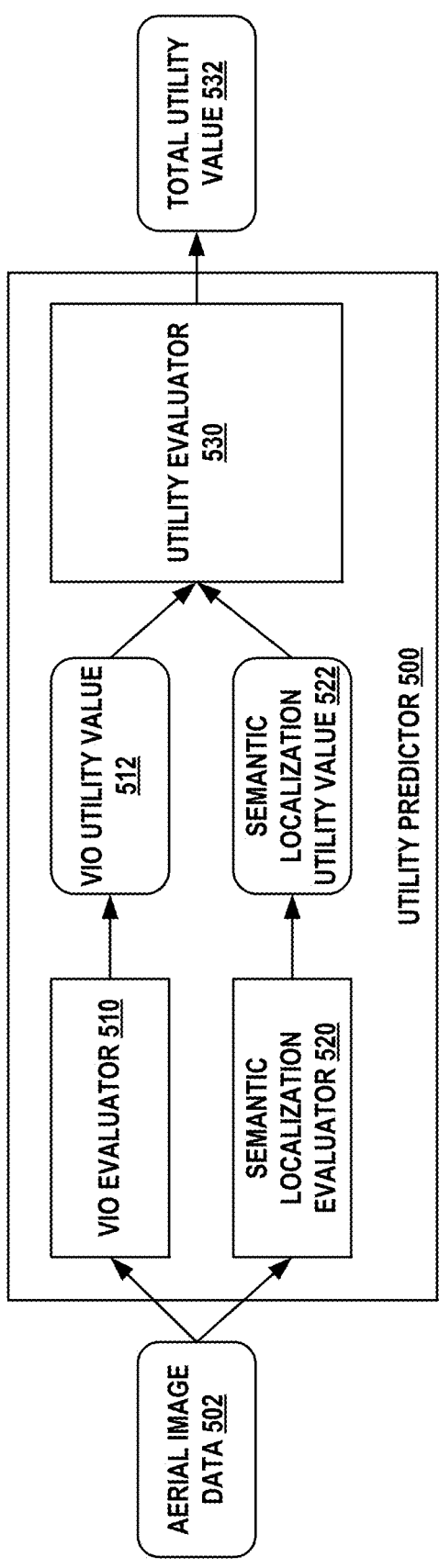
FIG. 5 illustrates a utility predictor, in accordance with examples described herein.

FIG. 5 illustrates aspects of utility predictor 500, which may be employed by property calculator 420 in the context of FIG. 4. Utility predictor 500 may be configured to obtain aerial image data 502 and output total utility value 532. Utility predictor 500 may include VIO evaluator 510, which may be configured to generate VIO utility value 512 based on aerial image data 502. Utility predictor 500 may include semantic localization evaluator 520, which may be configured to generate semantic localization utility value 522 based on aerial image data 502. Utility predictor 500 may also include utility evaluator 530, which may output total utility value 532 based on a combination of VIO utility value 512 and/or semantic localization utility value 522.

Aerial image data 502 may be an example of aerial image data 414 of FIG. 4, which may include, for instance, aerial images that are expected to be obtainable but may not yet be obtained and/or reference aerial images. In some examples, aerial image data 502 may additionally or alternatively represent and/or be associated with aerial image data property 422, such as heatmap 406 of FIG. 4. Other possibilities exist.

VIO evaluator 510 may be configured to determine VIO utility value 512 based on aerial image data 502. As discussed above, a VIO system may rely in part on an ability to detect the same visual features within sequential (e.g., consecutive) aerial image frames. For example, the VIO system could be configured to detect a red car in two sequentially-captured aerial images. Due to motion of the aerial vehicle, the red car may appear (i) at the top edge of a first aerial image of the two sequentially-captured aerial images and (ii) in the center of a second aerial image of the two sequentially-captured aerial images. The apparent displacement of the red car between the first and second aerial image may be used to determine an estimate of a pose and/or motion of the aerial vehicle.

Accordingly, VIO utility value 512 could be based on an extent of visual features expected to be detectable within each of two or more sequential aerial images of aerial image data 502. Each of the two or more sequential aerial images may represent a common portion of the environment, and may thus allow an apparent motion of the common portion to be used as a basis for determining the pose and/or motion of the aerial vehicle. VIO utility value 512, and/or the extent of visual features expected to be detectable, could be based in part on a number of the visual features, a consistency of the visual features across multiple frames, a spatial distribution of the visual features (e.g., uniformity and/or clustering), a feature matching quality (e.g., matching accuracy between aerial image frames), a temporal consistency of the visual features, a scale-invariance of the visual features, a saliency feature detection, and/or a feature diversity.

For instance, if aerial image data 502 represents a rural environment with few distinct visual features (e.g., fields of crops in all directions), VIO evaluator 510 could determine a low likelihood of detecting the same visual features in each aerial image of a sequence of aerial images, and output VIO utility value 512 having a relatively low value. On the other hand, if aerial image data 502 represents a forested environment with many distinct trees and/or patterns thereof, VIO evaluator 510 could determine a high likelihood of detecting the same visual features in each aerial image of a sequence of aerial images, and output VIO utility value 512 having a relatively high value. Thus, for example, VIO evaluation 510 may assign higher VIO utility values to aerial images that are rich in visual features (e.g., textures, objects, patterns, etc.) that can be detected and tracked across the sequence of aerial images.

Semantic localization evaluator 520 may be configured to determine semantic localization utility value 522 based on aerial image data 502. As discussed above, semantic localization may rely in part on an ability to detect in an aerial image a visual feature and/or pattern of multiple visual features that is recognizable, locatable, unique, and/or distinguishable. Specifically, in order to localize the aerial vehicle with respect to the environment along a given aerial path, the visual feature and/or pattern of multiple visual features may be unique at least in the context of the environment along a given aerial path. For example, a semantic localization system could use a detection of a unique landmark in an aerial image captured by an aerial vehicle, such as the Eiffel Tower, to determine an approximate location of the aerial vehicle. Since the Eiffel Tower is unique (ignoring, for the sake of example, any replicas thereof), and thus indicates a particular geographic location in Paris, detection of the Eiffel Tower may indicate that the aerial vehicle is located at or near the particular geographic location.

Accordingly, semantic localization utility value 522 could be based on a measure of uniqueness of a visual feature expected to be detectable in aerial image data 502. One possible measure of uniqueness is an expected number of a specific visual feature in an environment represented by aerial image data 502 (e.g., the environment along an aerial path). For instance, in a rural environment of cornfields, a house with a red roof could be a relatively unique feature of the rural environment. As such, a red roof may be determined to be unique relative to the rest of the rural environment, suggesting that an aerial path over the red roof would be beneficial for semantic localization, since detection of the red roof may be used to unambiguously localize the aerial vehicle in the rural environment. On the other hand, in a suburban environment, a house with a red roof could be a relatively common feature of the suburban environment. As such, a red roof may be determined to be non-unique relative to the rest of the suburban environment, suggesting that an aerial path over the red roof would not be beneficial for semantic localization, since detection of the red roof could suggest multiple different geographic locations. Other examples of semantic localization utility value 522 could relate a semantic richness, for instance a number, amount, and/or variety of objects, scenes, and/or symbols, and/or a complexity and richness of their associated semantic meanings.

Utility evaluator 530 may be configured to output total utility value 532 based on a combined utility of aerial image data 502 for both VIO and semantic localization. Total utility value 532 may be represented in the same or similar manner as aerial image data property 422, as discussed in the context of FIG. 4.

Accordingly, utility evaluator 530 may be configured to combine VIO utility value 512 and semantic localization utility value 522 using, for example, associated weights (e.g., equally weighted, all VIO, all semantic localization, or some other combination). For example, total utility value 532 may be a weighted sum of VIO utility value 512 and semantic localization utility value 522. The weights assigned to VIO utility value 512 and semantic localization utility value 522 could be pre-determined and/or adjustable (e.g., by a user of aerial path system 400) on a case-by-case basis.

For instance, if it is known that a blizzard is incoming, it may be beneficial to weigh VIO utility value 512 more heavily than semantic localization utility value 522, as white-out conditions could worsen the performance of a VIO system. As another example, if aerial image data 502 represents a sandy desert with a few unique-looking palm trees spaced far apart from each other, VIO evaluator 510 may determine that aerial image data 502 includes very few visual features that could be captured in sequential aerial images. Thus, VIO utility value 512 could be relatively low. However, semantic localization evaluator 520 may determine that the unique-looking palm trees in aerial image data 502 are relatively useful for semantic localization, so semantic localization utility value 522 could be relatively high. Total utility value 532 could be relatively low or relatively high (or somewhere in the middle) depending on the respective weights assigned to each of VIO utility value 512 and semantic localization utility value 522.

In some examples, VIO evaluator 510 and/or semantic localization evaluator 520 may be configured to obtain a reference aerial image (e.g., as part of aerial image data 502) representing the environment along the aerial path and determine, based on the reference aerial image, a visual feature expected to be detectable in the aerial image data. This may be used, for example, to determine VIO utility and/or semantic localization utility value 522 based on existing aerial image data 502 of the environment. For example, if an aerial path is generated from London to Paris, semantic localization evaluator 520 could use existing information to determine that a relatively unique feature (e.g., the Eiffel Tower) is expected to be detectable along the aerial path, and output semantic localization utility value 522 accordingly. As another example, if an aerial path is generated over New York City, semantic localization evaluator 520 could obtain a reference aerial image illustrating that New York City has relatively few parks. Semantic localization evaluator could determine that a park would be relatively unique in the aerial path over New York City, and output semantic localization utility value 522 accordingly.

In some examples, VIO evaluator 510 and/or semantic localization evaluator 520 may be configured to use machine learning techniques to generate their respective output based on aerial image data 502. Machine learning models (e.g., a neural network) may be able to detect patterns and relationships within aerial image data 502, helping enable the generation of VIO utility value 512 and/or semantic localization utility value 522. The use of machine learning models may help automate the process of feature extraction, reducing the need for manual intervention and accelerating the evaluation process. Additionally, machine learning models may enable analysis of large volumes of aerial image data efficiently, and machine learning models may be trained to detect a wide range of visual features, providing flexibility to address navigation and localization systems.

For example, by training machine learning models on labeled datasets containing (i) training aerial image data and (ii) corresponding labels indicating ground-truth VIO utility values and/or ground-truth semantic localization utility values, machine learning models can learn to identify and quantify relevant visual features. For instance, convolutional neural networks (CNNs) can be trained to detect objects, shapes, textures, or other visual patterns within the aerial images. Once trained, these machine learning models can process new instances of aerial image data 502 and predict VIO utility value 512 and/or semantic localization utility value 522.

As another example, machine learning models may be used to process aerial image data and generate semantic maps, which may annotate the aerial image data with semantic labels such as roads, buildings, vegetation, landmarks, and/or other relevant semantic labels. Semantic maps may form part of aerial image data 502, and may thus be used to determine VIO utility value 512 and/or semantic localization utility value 522. For example, semantic maps of an environment may indicate a variety of classes and/or categories of detected features, such as cars, houses, roads, etc. For instance, a semantic map could include a list with counts of different features (e.g., "3 cars, 2 houses" in an aerial image containing three cars and two houses). Measures such as the number of semantic classes present in the semantic map and/or the uniqueness of semantic classes present in the semantic map compared to another environment, among other possibilities, could be utilized to determine total utility value 532.

c. Illustrative Embodiments

Figure 6:
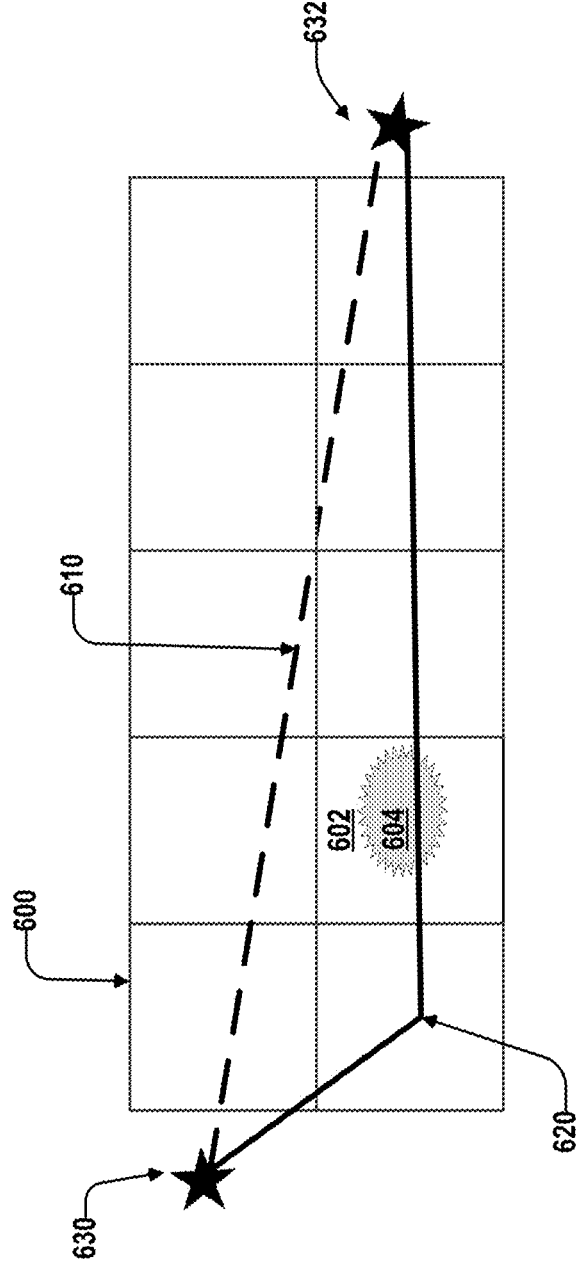
FIG. 6 illustrates aerial paths, in accordance with examples described herein.

FIG. 6 illustrates environment 600, with aerial path 610 and aerial path 620 from starting location 630 to destination location 632. Tile 602 includes visual feature 604. While traveling along aerial path 620, an aerial vehicle may be able to obtain aerial image data representing tile 602, and the aerial image data may thus include a representation of visual feature 604.

Starting location 630 and destination location 632 provide one example of starting location 402 and destination location 404 of FIG. 4, respectively. Starting location 630 and destination location 634 could be processed by aerial path system 400 to generate aerial path 620. Specifically, aerial path calculator 410 could generate aerial paths 610 and 620. Property calculator 420 could determine, for each respective aerial path of aerial paths 610 and 620, a corresponding aerial image data property 422 representing an extent of visual features expected to be detected in corresponding aerial image data 414 along the respective aerial path. The corresponding aerial image data property 422 could represent, for example, a number of visual features that are detectable in the corresponding aerial image data 414.

Path score calculator 430 could determine, based on aerial image data property 422, that aerial path 610 has zero visual features expected to be detected in aerial image data 414 corresponding thereto, and thus assign a score of zero to aerial path 610. Likewise, path score calculator 430 could determine, based on aerial image data property 422, that aerial path 620 has one visual feature expected to be detected in aerial image data 414 corresponding thereto, and assign a score of one to aerial path 620. Aerial path calculator 410 could provide, as output of aerial path system 400, aerial path 620, but not aerial path 610, because the corresponding path score 432 of aerial path 620 exceeds the corresponding path score 432 of aerial path 610. Thus, aerial path system 400 could output an aerial path along which the aerial vehicle is expected to be able to observe relatively more visual features in the environment. Accordingly, aerial path system 400 may be used to select aerial paths that have a higher usability of aerial image data 414 for controlling and/or navigating the aerial vehicle thus improving the health and/or viability of the image-based navigation systems of the aerial vehicle.

As one example, environment 600 could represent a farming community, where starting location 630 represents a delivery warehouse and destination location 632 represents a farmhouse where a recipient of a package resides. Aerial path 610 and aerial path 612 could represent possible flight trajectories for an aerial vehicle to travel along to deliver the package to the farmhouse. Much of the farming community could include fields of crops that may be difficult to visually distinguish. Such fields of crops may be represented by tiles in environment 600 containing little to no visual features. Accordingly, if the aerial vehicle travels along aerial path 610, it may be difficult for the aerial vehicle to locate, using aerial image data, where the aerial vehicle is along aerial path 610. By contrast, visual feature 604 could represent an object in the farming community that stands out (e.g., is visually distinct) from the fields of crops, such as a grain silo. As such, if the aerial vehicle instead travels along aerial path 620, the aerial vehicle may be able to detect when it is flying over the grain silo and locate where the aerial vehicle is along aerial path 620.

This "check-in" point along aerial path 620 (i.e., the grain silo) may enable the aerial vehicle to more accurately follow and/or confirm that the aerial vehicle is following the correct flight trajectory, thus improving the package delivery process. Further, in cases where a primary navigation system of the aerial vehicle malfunctions, this "check in" point may allow the aerial vehicle to determine its location along aerial path 620 and/or within the larger environment. Thus, it may be beneficial for aerial path system 400 to generate or select aerial path 620 instead of aerial path 610.

Figures 7A, 7B, 7C:
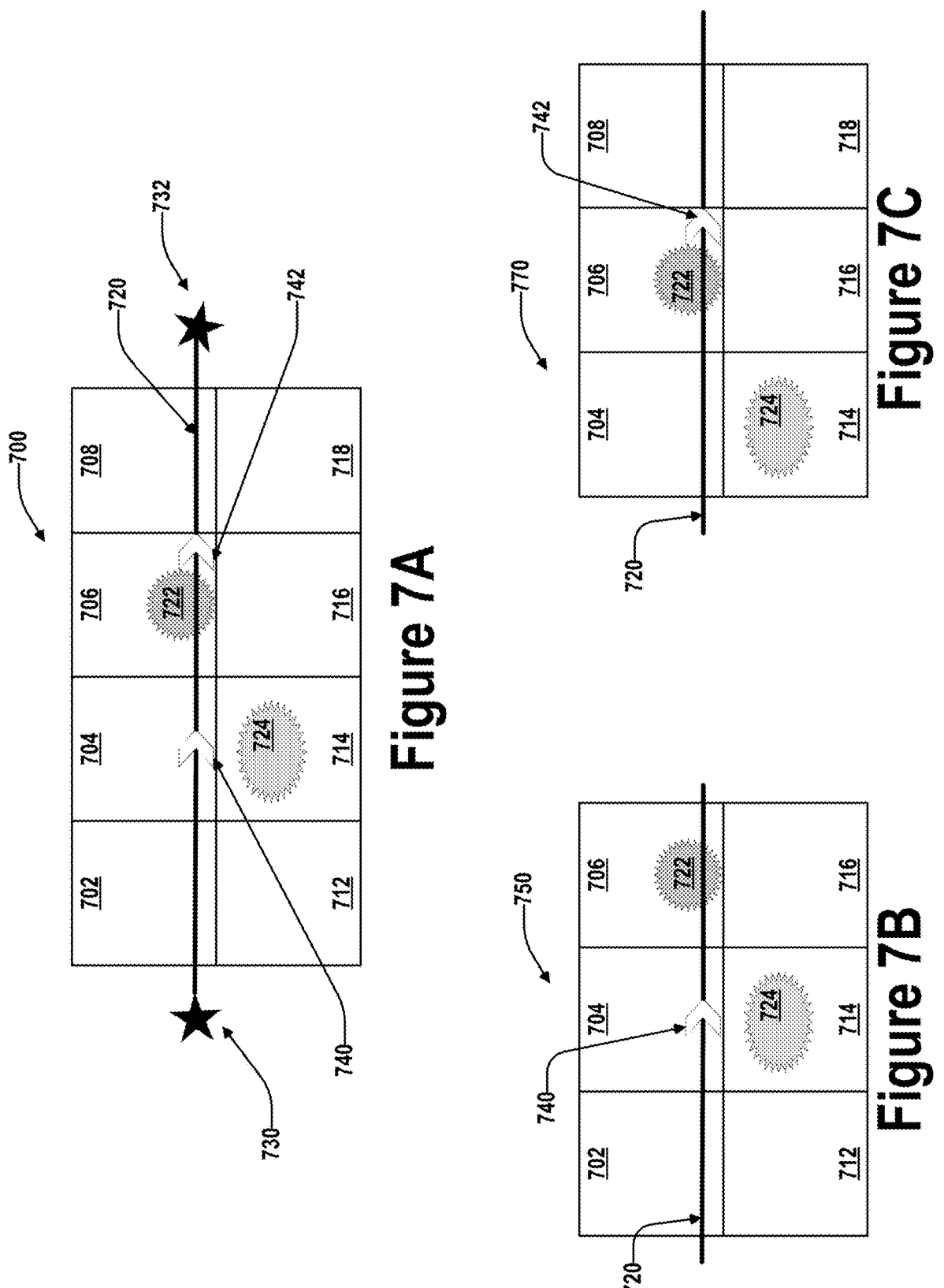
FIGS. 7A, 7B, and 7C illustrate aerial paths, in accordance with examples described herein.

FIG. 7A illustrates environment 700, with aerial path 720 from starting location 730 to destination location 732. Starting location 730 and destination location 732 provide one example of starting location 402 and destination location 404 of FIG. 4, respectively. Environment 700 includes tile 702, tile 704, tile 706, tile 708, tile 712, tile 714, tile 716, and tile 718. Tile 706 includes visual feature 722, and tile 714 includes visual feature 724. Additionally, FIG. 7A represents an aerial vehicle at position 740 and at position 742 at different points along aerial path 720 (e.g., position 742 could be temporally after position 740).

FIG. 7B illustrates aerial image data 750 of a subset of environment 700, including tiles 702-706 and 712-716. While traveling along aerial path 720, the aerial vehicle may, when located at position 740, be able to obtain aerial image data representing environment 700. FIG. 7C illustrates aerial image data 770 of a subset of environment 700, including tiles 704-708 and 714-718. While traveling along aerial path 720, the aerial vehicle may, when located at position 742, be able to obtain aerial image data representing environment 700. FIGS. 7B and 7C thus illustrate how visual feature 724 of tile 714 and visual feature 722 of tile 706 may appear in sequential aerial images that represent a common/shared portion of environment 700. Specifically, FIGS. 7A-7C illustrate a pattern of visual features that may be useful for navigating the aerial vehicle using VIO.

Starting location 730 and destination location 732 could be processed by aerial path system 400 to generate aerial path 720. Specifically, aerial path calculator 410 could generate aerial path 720. Property calculator 420 could determine aerial image data property 422 representing a predicted utility of aerial image data 750 and 770 obtainable along aerial path 720 for navigating the aerial vehicle in the environment using VIO. For example, aerial image data property 422 could represent an extent of visual features (e.g., visual features 722 and 724) expected to be detectable within each of sequential aerial images 750 and 770, where each of sequential aerial images 750 and 770 represents a common portion (i.e., tiles 704, 706, 714, and 716) of environment 700. Path score calculator 430 could determine, based on aerial image data property 422, that aerial path 720 has two visual features expected to be present in sequential aerial images 750 and 770, and could score aerial path 720 accordingly. Then, aerial path calculator 410 could output aerial path 720 based on the score thereof indicating that aerial path 720 allows for navigation of aerial vehicle using VIO. Thus, aerial path system 400 could output an aerial path that may have a more positive impact on the health and/or viability of the VIO navigation systems.

As one example, environment 700 could represent a suburban area, where starting location 730 represents a delivery warehouse and destination location 732 represents a house where a recipient of a package resides. Aerial path 720 could represent a flight trajectory for an aerial vehicle to travel along to deliver the package to the house. Visual feature 724 could represent a house with a red roof, and visual feature 722 could represent a house with a blue roof. In some cases, a satellite-based navigation system of the aerial vehicle may fail and/or malfunction, and thus the aerial vehicle may determine its pose and/or motion properties using aerial image data 750 and 770. Specifically, by capturing sequential aerial images 750 and 770, the aerial vehicle may be able to detect when the aerial vehicle is above the red roof with the blue roof ahead of it (position 740), and then when the aerial vehicle is above the blue roof with the red roof behind it (position 742). This information could be used by the aerial vehicle to detect its pose and/or motion properties, for example, to determine that it is traveling along aerial path 720 from left to right at a particular speed and/or acceleration. Thus, generating aerial path 720 with visual features expected to be present in sequential aerial images may improve navigation or other aspects of aerial travel for the aerial vehicle.

Figure 8:
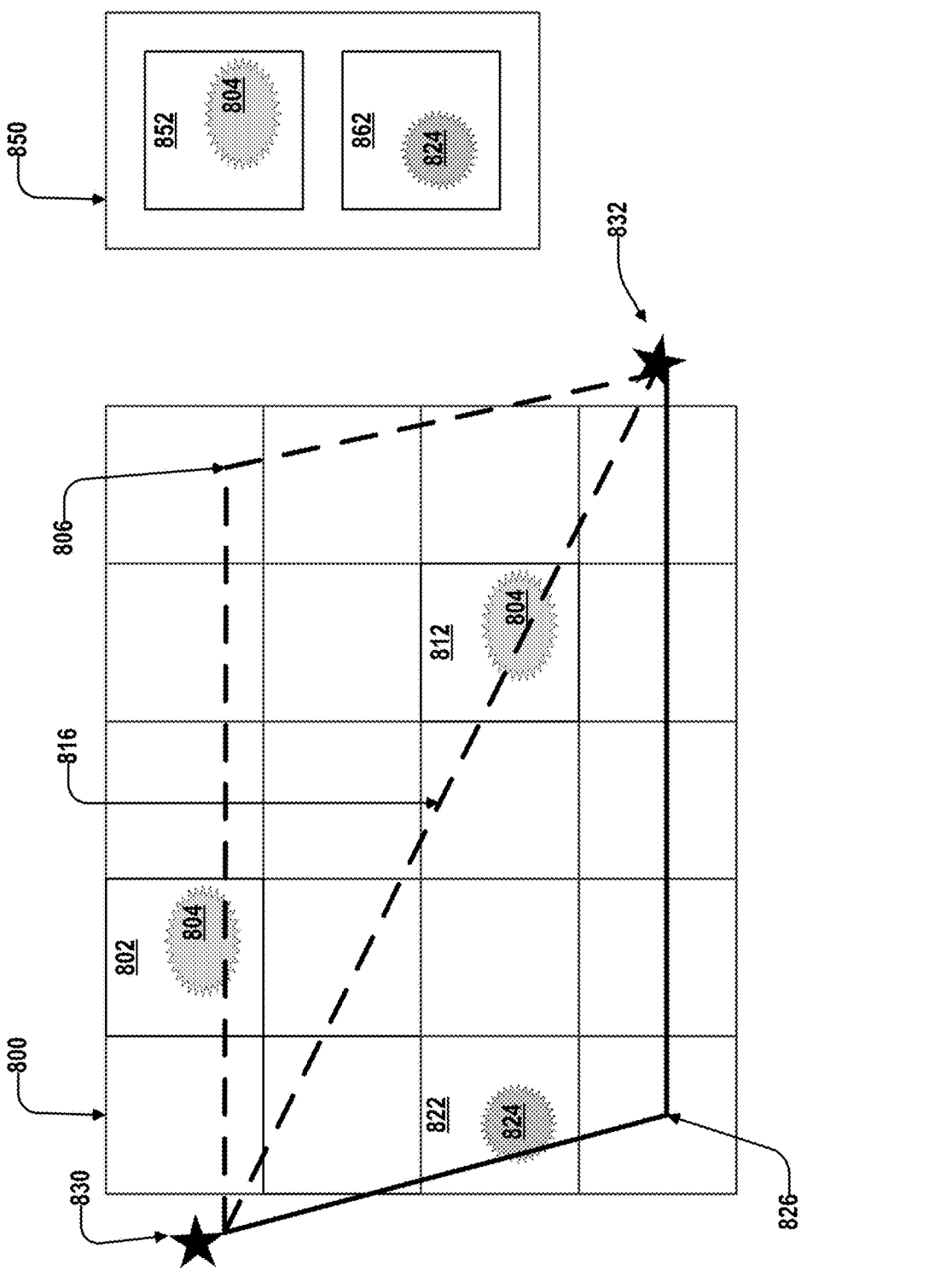
FIG. 8 illustrates aerial paths, in accordance with examples described herein.

FIG. 8 illustrates environment 800, aerial path 806, aerial path 816, aerial path 826, starting location 830, and destination location 832. Each of aerial path 816 and 826 extends from starting location 830 to destination location 832. Starting location 830 and destination location 832 provide one example of starting location 402 and destination location 404 of FIG. 4, respectively.

Tile 802 includes visual feature 804, tile 812 also includes visual feature 804, and tile 822 includes visual feature 824. While traveling along aerial path 806, an aerial vehicle may be able to obtain aerial image data representing tile 802 that includes visual feature 804. Likewise, while traveling along aerial path 816, an aerial vehicle may be able to obtain aerial image data representing tile 812 that includes visual feature 804. While traveling along aerial path 816, an aerial vehicle may be able to obtain aerial image data representing tile 822 that includes visual feature 824. Thus, visual feature 824 can be used to uniquely localize the aerial vehicle within tile 822, while visual feature 804 is found in both tiles 802 and 812 and thus cannot be used to uniquely localize the aerial vehicle within environment 800.

FIG. 8 also includes reference image 850, which has tile 852 containing visual feature 804 and tile 862 containing visual feature 824. Tile 852 may be associated with location data indicating a geographic location of visual feature 804, and tile 862 may be associated with location data indicating a geographic location of visual feature 824.

Starting location 830 and destination location 834 could be processed by aerial path system 400 to generate as an output thereof aerial path 826. Specifically, aerial path calculator 410 could generate aerial paths 806, 816, and 826. Property calculator 420 could determine, for each respective aerial path of aerial paths 806, 816, and 826, a corresponding aerial image data property 422 representing a predicted utility of corresponding aerial image data 414 for semantic localization of the aerial vehicle in the environment along the respective aerial path. For example, the predicted utility of the corresponding aerial image data 414 could be based on a measure of uniqueness of a visual feature expected to be detectable in the corresponding aerial image data 414.

Path score calculator 430 could determine, based on the corresponding aerial image data property 422, that (i) aerial path 806 includes one non-unique visual feature 804 and zero unique visual features, (ii) aerial path 816 includes one non-unique visual feature 804 and zero unique visual features, and (iii) aerial path 826 includes one unique visual feature 824. Based on reference image 850, an aerial vehicle traveling along aerial path 826 could, using semantic localization and based on unique visual feature 824, determine that aerial vehicle is located in tile 822.

However, an aerial vehicle traveling along aerial path 806 or aerial path 816 could not use visual feature 824 to establish whether the aerial vehicle is located in tile 802 or tile 812. As such, the distinguishability and/or ability of visual feature 824 to be uniquely located within environment 800 may improve its utility as a visual feature for semantic localization. Accordingly, path score calculator 430 could assign aerial paths 806 and 816 scores of zero and aerial path 826 a score of one. Aerial path calculator 410 could output aerial path 826 for the aerial vehicle to follow through environment 800, even though aerial paths 816 and/or 806 may be shorter and/or require less energy, in part because aerial path 826 includes relatively more unique visual features expected to be detectable in the aerial image data of the environment 800. Thus, aerial path system 400 could output aerial path 826 that may have a more positive impact on the health and/or viability of the semantic localization systems of the aerial vehicle than aerial path 806 and/or 816.

As one example, environment 800 could represent an urban area, where starting location 830 represents a delivery warehouse and destination location 832 represents a home where a recipient of a package resides. Aerial path 806, aerial path 816, and aerial path 826 could represent possible flight trajectories for an aerial vehicle to travel along to deliver the package to the home. The urban area may have many similar-looking features. For example, visual feature 804 could represent an apartment building that looks the same as and/or similar to other apartment buildings in the area. Additionally, the urban area could have some unique features, for example visual feature 824 could represent a playground with a large pink slide.

Accordingly, if the aerial vehicle travels along aerial path 806 or aerial path 816, it may be difficult for the aerial vehicle to determine whether it is located above tile 802 or above tile 812 when it detects visual feature 804. In other words, the aerial vehicle could be flying over either of the similar looking apartment buildings. By contrast, if the aerial vehicle travels along aerial path 826, the aerial vehicle may be able to detect the pink slide below it and locate its position as being above tile 822. The ability of the aerial vehicle to locate its position by visual feature detection and/or semantic information from aerial image data may enable the aerial vehicle to more accurately follow and/or confirm its flight trajectory, improving the package delivery process. Thus, it may be beneficial for aerial path system 400 to generate or select aerial path 826 instead of aerial path 806 or aerial path 816.

The principles illustrated by FIGS. 6, 7A-7C, and 8 may be applied at various levels of granularity to aerial paths of varying length. For example, aerial path system 400 may determine aerial path 442 such that aerial path 442 includes (i) first visual features that are sufficient for navigating the aerial vehicle using VIO along at least a threshold fraction of aerial path 442 and (ii) visual features that are sufficient for localizing the aerial vehicle at predetermined increments along aerial path 442. Thus, if a primary navigation system (e.g., the satellite-based navigation system) of the aerial vehicle were to malfunction, aerial path 442 may allow the aerial vehicle to determine and/or track is position using aerial image data, and to do so both locally (e.g., using VIO) and globally (e.g., using semantic localization). Accordingly, aerial path 442 may be determined and/or optimized based on considerations of aerial image data quality, as well as energy, power, distance, and/or travel time, among others.

VI. Additional Example Operations

FIG. 9 illustrates a flow chart of operations related to generating aerial paths based on properties of aerial image data. The operations may be carried out by and/or using various computing devices, such as aerial vehicle 200, system 300, aerial path system 400, and/or utility predictor 500, among other possibilities. The embodiments of FIG. 9 may be simplified by the removal of any one or more of the features shown therein. Further, these embodiments may be combined with features, aspects, and/or implementations of any of the previous figures or otherwise described herein.

Block 900 may involve receiving an input specifying a starting location and a destination location for an aerial vehicle.

Block 902 may involve determining, based on the starting location and the destination location, an aerial path for the aerial vehicle to follow from the starting location to the destination location.

Block 904 may involve determining, based on the aerial path, a property of aerial image data. The aerial image data may be obtainable using the aerial vehicle while traversing the aerial path. The aerial image data may represent an environment along the aerial path.

Block 906 may involve determining, based on the property, a path score associated with the aerial path.

Block 908 may involve outputting the aerial path based on the path score.

In some examples, the property may represent a quantitative measure of visual features expected to be detectable in the aerial image data. The quantitative measure may be indicative of a usability of the aerial image data for controlling the aerial vehicle (e.g., using semantic localization and/or VIO).

In some examples, the property may include a predicted utility of the aerial image data for navigating the aerial vehicle in the environment using VIO.

In some examples, the predicted utility of the aerial image data may be based on an extent of visual features expected to be detectable within each of two or more sequential aerial images of the aerial image data. Each of the two or more sequential aerial images may represent a common portion of the environment.

In some examples, the predicted utility of the aerial image data may be determined using a machine learning model.

In some examples, the property may include a predicted utility of the aerial image data for semantic localization of the aerial vehicle in the environment.

In some examples, the predicted utility of the aerial image data may be based on a measure of uniqueness of a visual feature expected to be detectable in the aerial image data.

In some examples, determining the property of aerial image data may include obtaining, based on the aerial path, a reference aerial image representing the environment along the aerial path and determining, based on the reference aerial image, a visual feature expected to be detectable in the aerial image data. The predicted utility of the aerial image data may be based on the visual feature.

In some examples, determining the visual feature may include identifying the visual feature based on a semantic map corresponding to the reference aerial image.

In some examples, the predicted utility of the aerial image data may be determined using a machine learning model.

In some examples, determining the aerial path may include determining a plurality of aerial paths from the starting location to the destination location. Determining the property of aerial image data may include determining, for each respective aerial path of the plurality of aerial paths, a corresponding property of respective aerial image data that (i) may be obtainable using the aerial vehicle while traversing the respective aerial path and (ii) may represent a corresponding environment along the respective aerial path. Determining the path score may include determining, for each respective aerial path and based on the corresponding property of the respective aerial image data, a corresponding path score associated with the respective aerial path. Outputting the aerial path may include outputting the aerial path may include selecting the aerial path from the plurality of aerial paths based on the corresponding path score of each respective aerial path.

In some examples, determining the aerial path may include providing, as input to a path-planning algorithm, (i) the starting location, (ii) the destination location, and (iii) a representation of a function configured to determine the path score. The path-planning algorithm may be configured to determine the aerial path based on the starting location, the destination location, and the function. Determining the path score may include determining the path score by evaluating, in connection with the path-planning algorithm, the function based on the property of the aerial image data.

Some examples may include modifying the aerial path based on the path score and outputting the modified aerial path.

Some examples may include receiving additional aerial image data representing the environment along the aerial path. The additional aerial image data may be obtained using the aerial vehicle while the aerial vehicle traverses the aerial path. Some examples may also include determining, based on the aerial image data and the additional aerial image data, a difference between the aerial image data and the additional aerial image data. Some examples may further include modifying the aerial path based on the difference, and outputting the modified aerial path.

Some examples may include obtaining, based on the aerial path, heatmap representing (i) a plurality of planned aerial paths from the starting location to the destination location and (ii) a plurality of actual aerial paths from the starting location to the destination location. Some examples may include determining, based on the heatmap, a difference between the plurality of planned aerial paths and the plurality of actual aerial paths, and determining the path score further based on the difference.

Some examples may include determining, based on the aerial path, a second property of the aerial image data. The property may include a predicted utility of the aerial image data for navigating the aerial vehicle in the environment using VIO, and the second property may include a predicted utility of the aerial image data for semantic localization of the aerial vehicle in the environment. The path score may be determined further based on the second property.

Some examples may include receiving an energy expenditure associated with the aerial path and determining the path score further based on the energy expenditure.

Some examples may include receiving a travel time associated with the aerial path and determining the path score further based on the travel time.

Some examples may include receiving spatio-temporal conditions associated with the aerial path and determining the property of the aerial image data and/or the path score further based on the spatio-temporal conditions. In some examples, the aerial image data may include baseline aerial image data that does not represent the spatio-temporal conditions. In some examples, the aerial image data may include and/or be associated with a representation of the spatio-temporal conditions.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method, comprising:
   receiving an input specifying a starting location and a destination location for an aerial vehicle;
   determining, based on the starting location and the destination location, an aerial path for the aerial vehicle to follow from the starting location to the destination location;
   determining, based on the aerial path, a property of aerial image data, wherein the aerial image data is obtainable using the aerial vehicle while traversing the aerial path, and wherein the aerial image data represents an environment along the aerial path;
   determining, based on the property, a path score associated with the aerial path; and
   outputting the aerial path based on the path score.

2. The computer-implemented method of claim 1, wherein the property represents a quantitative measure of visual features expected to be detectable in the aerial image data, and wherein the quantitative measure is indicative of a usability of the aerial image data for controlling the aerial vehicle.

3. The computer-implemented method of claim 1, wherein the property comprises a predicted utility of the aerial image data for navigating the aerial vehicle in the environment using visual-inertial odometry (VIO).

4. The computer-implemented method of claim 3, wherein the predicted utility of the aerial image data is based on an extent of visual features expected to be detectable within each of two or more sequential aerial images of the aerial image data, wherein each of the two or more sequential aerial images represents a common portion of the environment.

5. The computer-implemented method of claim 4, wherein the predicted utility of the aerial image data is determined using a machine learning model.

6. The computer-implemented method of claim 1, wherein the property comprises a predicted utility of the aerial image data for semantic localization of the aerial vehicle in the environment.

7. The computer-implemented method of claim 6, wherein the predicted utility of the aerial image data is based on a measure of uniqueness of a visual feature expected to be detectable in the aerial image data.

8. The computer-implemented method of claim 6, wherein determining the property of aerial image data comprises:

obtaining, based on the aerial path, a reference aerial image representing the environment along the aerial path; and determining, based on the reference aerial image, a visual feature expected to be detectable in the aerial image data, wherein the predicted utility of the aerial image data is based on the visual feature.

9. The computer-implemented method of claim 8, wherein determining the visual feature comprises:

identifying the visual feature based on a semantic map corresponding to the reference aerial image.

10. The computer-implemented method of claim 6, wherein the predicted utility of the aerial image data is determined using a machine learning model.

11. The computer-implemented method of claim 1, wherein:

determining the aerial path comprises determining a plurality of aerial paths from the starting location to the destination location;

determining the property of aerial image data comprises determining, for each respective aerial path of the plurality of aerial paths, a corresponding property of respective aerial image data that (i) is obtainable using the aerial vehicle while traversing the respective aerial path and (ii) represents a corresponding environment along the respective aerial path;

determining the path score comprises determining, for each respective aerial path and based on the corresponding property of the respective aerial image data, a corresponding path score associated with the respective aerial path; and outputting the aerial path comprises selecting the aerial path from the plurality of aerial paths based on the corresponding path score of each respective aerial path.

12. The computer-implemented method of claim 1, wherein:

determining the aerial path comprises providing, as input to a path-planning algorithm, (i) the starting location, (ii) the destination location, and (iii) a representation of a function configured to determine the path score, wherein the path-planning algorithm is configured to determine the aerial path based on the starting location, the destination location, and the function; and determining the path score comprises determining the path score by evaluating, in connection with the path-planning algorithm, the function based on the property of the aerial image data.

13. The computer-implemented method of claim 1, further comprising:

modifying the aerial path based on the path score; and
outputting the modified aerial path.

14. The computer-implemented method of claim 1, further comprising:

receiving additional aerial image data representing the environment along the aerial path, wherein the additional aerial image data is obtained using the aerial vehicle while the aerial vehicle traverses the aerial path;

determining, based on the aerial image data and the additional aerial image data, a difference between the aerial image data and the additional aerial image data;

modifying the aerial path based on the difference; and
outputting the modified aerial path.

15. The computer-implemented method of claim 1, further comprising:

obtaining, based on the aerial path, a heatmap representing (i) a plurality of planned aerial paths from the starting location to the destination location and (ii) a plurality of actual aerial paths from the starting location to the destination location;

determining, based on the heatmap, a difference between the plurality of planned aerial paths and the plurality of actual aerial paths; and determining the path score further based on the difference.

16. The computer-implemented method of claim 1, further comprising:

determining, based on the aerial path, a second property of the aerial image data, wherein:

the property comprises a predicted utility of the aerial image data for navigating the aerial vehicle in the environment using visual-inertial odometry (VIO), the second property comprises a predicted utility of the aerial image data for semantic localization of the aerial vehicle in the environment, and the path score is determined further based on the second property.

17. The computer-implemented method of claim 1, further comprising:

receiving an energy expenditure associated with the aerial path; and determining the path score further based on the energy expenditure.

18. The computer-implemented method of claim 1, further comprising:

receiving a travel time associated with the aerial path; and determining the path score further based on the travel time.

19. A system comprising:
a processor; and
a non-transitory computer-readable medium having stored thereon instructions that,
when executed by the processor, cause the processor to perform operations comprising:

receiving an input specifying a starting location and a destination location for an aerial vehicle;

determining, based on the starting location and the destination location, an aerial path for the aerial vehicle to follow from the starting location to the destination location;

determining, based on the aerial path, a property of aerial image data, wherein the aerial image data is obtainable using the aerial vehicle while traversing the aerial path, and wherein the aerial image data represents an environment along the aerial path;

determining, based on the property, a path score associated with the aerial path; and outputting the aerial path based on the path score.

20. A non-transitory computer readable medium comprising program instructions executable by one or more processors to perform operations, the operations comprising:

receiving an input specifying a starting location and a destination location for an aerial vehicle;

determining, based on the starting location and the destination location, an aerial path for the aerial vehicle to follow from the starting location to the destination location;

determining, based on the aerial path, a property of aerial image data, wherein the aerial image data is obtainable using the aerial vehicle while traversing the aerial path, and wherein the aerial image data represents an environment along the aerial path;

determining, based on the property, a path score associated with the aerial path; and outputting the aerial path based on the path score.

\* \* \* \* \*